(12) United States Patent
Tetreault et al.

(10) Patent No.: US 11,481,312 B2
(45) Date of Patent: Oct. 25, 2022

(54) AUTOMATION FRAMEWORK FOR MONITORING AND REPORTING ON RESOURCE CONSUMPTION AND PERFORMANCE BOTTLENECKS

(71) Applicant: EMC IP Holding Company LLC, Hopkinton, MA (US)

(72) Inventors: Brian R. Tetreault, Upton, MA (US); William James Sullivan, North Grafton, MA (US); Ginamarie E. Spiridigliozzi, Cumberland, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 17/071,298

(22) Filed: Oct. 15, 2020

(65) Prior Publication Data

US 2022/0121560 A1 Apr. 21, 2022

(51) Int. Cl.
*G06F 11/00* (2006.01)
*G06F 11/36* (2006.01)

(52) U.S. Cl.
CPC ...... *G06F 11/3688* (2013.01); *G06F 11/3692* (2013.01)

(58) Field of Classification Search
CPC .......................... G06F 11/3688; G06F 11/3692
See application file for complete search history.

(56) References Cited

U.S. PATENT DOCUMENTS

| | | | |
|---|---|---|---|
| 9,507,700 B1* | 11/2016 | Vignet | G06F 11/3688 |
| 10,684,940 B1* | 6/2020 | Kayal | G06F 11/368 |
| 2002/0066077 A1* | 5/2002 | Leung | G06F 11/368 714/E11.208 |
| 2003/0129573 A1* | 7/2003 | Bowers | G06F 11/3684 434/350 |
| 2009/0199160 A1* | 8/2009 | Vaitheeswaran | G06F 11/3688 717/124 |
| 2010/0095159 A1* | 4/2010 | Jeong | G06F 11/263 714/48 |
| 2016/0283356 A1* | 9/2016 | Waldman | G06F 11/3688 |
| 2016/0314064 A1* | 10/2016 | Moretto | H04L 41/5035 |

* cited by examiner

*Primary Examiner* — Joshua P Lottich
(74) *Attorney, Agent, or Firm* — Muirhead and Saturnelli, LLC

(57) ABSTRACT

Techniques for testing may include: receiving a first command at a framework, wherein the first command includes first information identifying a first test to be executed and a first collector that collects data during execution of the first test; and responsive to receiving the first command, perform processing to execute the first command, wherein the processing is coordinated by the framework and wherein the processing includes: executing the first test; collecting test data, wherein the test data is collected by the first collector during execution of the first test; and generating a report regarding the test data collected while executing the first test.

19 Claims, 22 Drawing Sheets

```
1000

1002  ./start_maps.py
1004  -cyc_path /home/cyc/dev/repos/cyclone/source/cyc_core
1006  -sys WX-D6024

1008  -metrics pg_stat cpu memory java_profile java_gc
1010  -mem_container
1012  -mem_jvm
1014  -mem_processes all 1016  -cpu_component CP
1018  -cpu_processes all
1020  -cpu_utilization 0.01
1022  -cpu_per_cpu_graphs 1024  -tests volumes -vol_count 500
```

FIG. 4A

1052: `./start_maps.py -cyc_path /home/cyc/dev/repos/cyclone/source/cyc_core -sys WX-D6024 -metrics pg_stat cpu memory java_profile java_gc -mem_container -mem_jvm -mem_processes all -cpu_component CP -cpu_processes all -cpu_utilization 0.01 -cpu_per_cpu_graphs -tests volumes -vol_count 500`

1054: 2020-08-20 14:07:12,952 - INFO Calling MAPS Collector setup()
1056: 2020-08-20 14:07:17,349 - INFO Setup Java Profiler Setup
1058: 2020-08-20 14:07:20,085 - INFO Restarting cp_java.service
1060: 2020-08-20 14:10:23,993 - INFO Setup Java Garbage Collection Setup
1062: 2020-08-20 14:10:41,524 - INFO Calling MAPS Collector start()
1064: 2020-08-20 14:10:41,527 - INFO Starting async profiler for java
1066: 2020-08-20 14:12:12,782 - INFO Test Starting: volumes
1068: 2020-08-20 18:23:10,112 - INFO Test Finished: volumes with status: Success
1070: 2020-08-20 18:23:10,112 - INFO Test Run Time = 0:10:57.320220
1072: 2020-08-20 18:23:10,112 - INFO Calling MAPS Collector stop()
1074: 2020-08-20 18:23:10,858 - INFO Stopping async profiler for java
1076: 2020-08-20 18:23:35,254 - INFO Calling MAPS Collector gather()
1078: 2020-08-20 18:24:23,240 - INFO Grabbing async profiler for java results
1080: 2020-08-20 18:24:30,082 - INFO Calling MAPS Collector post_processing()
1082: 2020-08-20 18:24:52,483 - INFO Calling MAPS Collector cleanup()
1084: 2020-08-20 18:24:56,101 - INFO Calling MAPS TestRunner get_report_sections()
1086: 2020-08-20 18:24:56,194 - INFO Calling MAPS Collector get_report_sections()
1088: 2020-08-20 18:24:56,195 - INFO Generating Report
1090: 2020-08-20 18:26:03,621 - INFO Created report: output/20200820-140712/MAPS_report.pdf
1092: 2020-08-20 18:26:03,621 - INFO Output can be found here: output/20200820-140712

652 Executing command: cd ../../../tests/performance_scripts/:./volumes-test.py 10.229.163.50 -volumes 500

654
2020-08-20 18:12:26,177 * creating 500 volumes *
2020-08-20 18:12:31,194 created job: testLun1 id b105315e-cc7f-48c8-861f-b9842fc50ed8 in 5.009538 seconds
2020-08-20 18:12:33,313 created job: testLun9 id 30aefbf9-37b7-4555-adf5-a2df7004082c in 7.1277 seconds
...
2020-08-20 18:14:00,011 A volume was created in 85.337 seconds [1/500]
2020-08-20 18:14:00,122 A volume was created in 63.849 seconds [2/500]
2020-08-20 18:14:00,187 A volume was created in 59.997 seconds [3/500]
...
2020-08-20 18:18:23,292 A volume was created in 238.561 seconds [499/500]
2020-08-20 18:18:23,330 A volume was created in 236.062 seconds [500/500]
2020-08-20 18:18:23,330 Total duration was 327.379 seconds 656
2020-08-20 18:18:23,330 * deleting 500 volumes *
2020-08-20 18:18:25,042 delete volume job (0): 67806f90-cb90-452a-9f22-92b93d400b59 in 1.711414 seconds
...
2020-08-20 18:23:10,046 delete volume job (499): 0b80b64f-ca94-4a92-9f07-da1969528401 in 0.325401 seconds
2020-08-20 18:23:10,046 Total delete time was 286.607079 seconds (0 failed)
...

FIG. 4D

```
"configs": [
    {
        "name": "main_config",    902
        "output_dir": "output",
        "controlpath_dir": "./../",
        "minimum_free_space": "15"
    },
    {
        "name": "environment_initializer_config",
        "environment_initializer_definitions": [
            {
                "name": "setup_v1",    906a
                "module": "setup_environment.setup_environment",
                "class": "Setup",
                "environment_initializer_config": "setup_environment/setup_v1.config"    906b
            },                                                                                                  ⎬ 906
            {
                "name": "setup_v2",    908a
                "module": "setup_environment.setup_environment_v2",
                "class": "Setup",
                "environment_initializer_config": "setup_environment/setup_v2.config"    908b
            },                                                                                                  ⎬ 908
        ]
    },                                                                                                              ⎬ 904
    {
        "name": "collector_config",
        "collector_definitions": [
            {
                "name": "sys_config",    912a
                "module": "collector.system.system_config_collector",
                "class": "SystemConfigCollector",
                "internal": true    912b
            },                                                                                                  ⎬ 912
            {
                "name": "cpu",    914a
                "module": "collector.cpu.cpu_collector",
                "class": "CpuCollector",
                "collector_config": "collector/cpu/cpu_collector.config"    914b
            },                                                                                                  ⎬ 914
        ]
    },                                                                                                              ⎬ 910
```

"name": "test_runner_config", 942
"test_runner_config": "tests/test_runner.config",
"test_definitions": [

{ ... }, 946
{ ... }, 948
{ ... } 950

] 944

"name": "custom",
"module": "tests.custom_test",
"class": "CustomTest"

"name": "manual",
"module": "tests.manual_test",
"class": "ManualTest"

"name": "volumes", 950a
"test_config": "tests/config/volumes_test.config" 950b

"test_result_mappers": [

{ ... }, 954
{ ... }, 956
{ ... } 958

] 952

"name": "ClientLogToReportTextMapper",
"module": "tests.test_result_report_mappers",
"class": "ClientLogToReportTextMapper"

"name": "ClientLogToReportScalarMapper",
"module": "tests.test_result_report_mappers",
"class": "ClientLogToReportScalarMapper"

"name": "MarkersDurationToReportScalarMapper",
"module": "tests.test_result_report_mappers",
"class": "MarkersDurationToReportScalarMapper"

302  "name": "volume_test",
304  "command_dir": "{controlpath_dir}/tests/performance_scripts/",
306  "command": "./volumes-test.py {sys0_cluster_ip}",
     "args": [
      {
308        "maps_name": "vol_count",          308a
           "test_name": "volumes",             308b
           "type": "int",                      308c
           "default": 2000,                    308d
           "required": false,                  308e
           "help": "Number of volumes to create (default=2000)"  308f
      }
     ],
     "marker_definitions": [
320    {
322a      "name": "Create Volumes Start",
322b      "type": "client",                                        322
322c      "match": "^.*\|\*\|\* creating.*$"
       },
       {
324a      "name": "Delete Volumes Start",
324b      "type": "client",                                        324
324c      "match": "^.*\|\*\|\* deleting.*$"
       }
     ],
```

FIG. 6A

```
"report_section_definitions": [
  {
    "name": "Volume Test Summary",   351
    "report_data_definitions": [
      {
        "name": "Volume Test Results",   354
        "type": "ClientLogToReportScalarMapper",   356
        "config": [
          {
            "name": "Mean Volume Create Time (sec)",   360a
            "match": "(?<=Mean Volume Create Time:\\s)(\\d*\\.?\\d*)"   360b
          },
          {
            "name": "Volume Create Throughput (req/sec)",   362a
            "match": "(?<=Volume Create Throughput:\\s)(\\d*\\.?\\d*)"   362b
          },
          {
            "name": "Total Volume Create Time (sec)",   364a
            "match": "(?<=Total Volume Create Time:\\s)(\\d*\\.?\\d*)"   364b
          },
          {
            "name": "Mean Volume Delete Time (sec)",   366a
            "match": "(?<=Mean Volume Delete Time:\\s)(\\d*\\.?\\d*)"   366b
          },
          {
            "name": "Volume Delete Throughput (req/sec)",   368a
            "match": "(?<=Volume Delete Throughput:\\s)(\\d*\\.?\\d*)"   368b
          },
          {
            "name": "Total Volume Delete Time (sec)",   370a
            "match": "(?<=Total Volume Delete Time:\\s)(\\d*\\.?\\d*)"   370b
          }
        ]
      }
    ]
  }
]
```

FIG. 6B

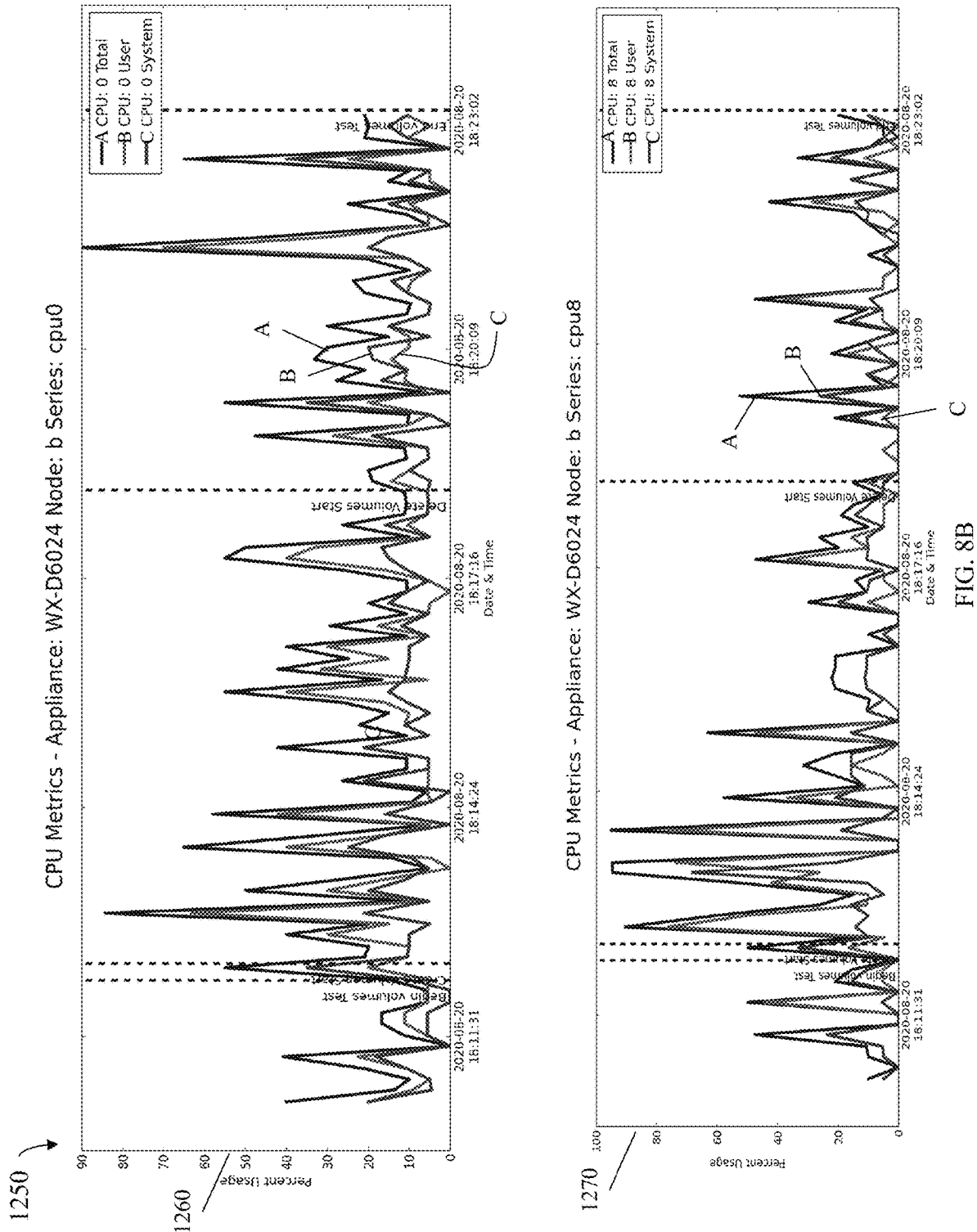

SQL Queries Largest Mean Time WX-D6024

| frequency | total_time | calls | mean_time | query |
|---|---|---|---|---|
| 2.82% | 2415.21535 | 8 | 301.901 92 | WITH pcmm2 AS (SELECT node_id, appliance_id, timestamp, core_num, idle_ticks :: bigint - Lag(idle_ticks :: bigint) over ( PARTITION BY node_id, appliance_id, core_num ORDER BY timestamp) AS idle_ticks_diff, total_ticks :: bigint - Lag(total_ticks :: bigint) over ( PARTITION BY node_id, appliance_id, core_num ORDER BY timestamp) AS total_ticks_diff FROM metric_get_pcmm1_fh(cpu_type_in, latest_metrics_flag) as pc ORDER BY timestamp ), pcmm3 AS (SELECT appliance_id, node_id, timestamp, core_num, SUM(Cast (pcm... |
| 1.13% | 964.22745 | 75 | 12.8563 7 | SELECT column_name FROM information_schema.table_constraints JOIN information_schema.key_column_usage USING (constraint_catalog, constraint_schema, constraint_name, table_catalog, table_schema, table_name) WHERE constraint_type = $1 AND table_schema = $2 AND table_name = $3 ORDER BY ordinal_position |
| 18.85% | 16130.3174 7 | 1500 | 10.7535 4 | insert into "internal"."internal_volume" ("id", "wwn", "name", "description", "type", "appliance_id", "is_read_only", "state", "size", "import_metadata", "creation_timestamp", "protection_policy_id", "performance_policy_id", "migration_session_id", "datapath_volume_id", "is_replication_destination", "datapath_family_id", "storage_type", "sector_size", "is_internal", "is_importing", "node_affinity", "platform_volume_guid", "is_user_selected_placement", "nsid", "nguid", "is_faulted") values ($1, $2, $3::citex... |

FIG. 9A

SQL Queries Largest Total Time WX-D6024

| | | |
|---|---|---|
| 18.85% 16130.31747 | 500 10.75354 | insert into "internal"."internal_volume" ("id", "wwn", "name", "description", "type", "appliance_id", "is_read_only", "state", "size", "import_metadata", "creation_timestamp", "protection_policy_id", "performance_policy_id", "migration_session_id", "datapath_volume_id", "is_replication_destination", "datapath_family_id", "storage_type", "sector_size", "is_internal", "is_importing", "node_affinity", "platform_volume_guid", "is_user_selected_placement", "nsid", "nguid", "is_faulted") values ($1, $2, $3::citex... |
| 9.88% 8456.85860 | 1500 5.63791 | SELECT column_name FROM information_schema.columns WHERE table_schema = TG_TABLE_SCHEMA AND table_name = TG_TABLE_NAME |
| 9.17% 7845.07705 | 5464 1.43579 | with pending_resource_ids AS (select "internal"."lock_request"."resource_id" as ids from "internal"."lock_request" where "internal"."lock_request"."lock_status"=$1) select * from "internal"."lock_request" where "internal"."lock_request"."resource_id" IN (select ids from pending_resource_ids) |
| 7.97% 6815.24564 | 18369 0.37102 | insert into "internal"."state_machines" ("id", "type", "context", "state", "scheduled_trigger", "metadata", "command_id", "is_encrypted") values ($1::uuid, $2, $3, $4, $5, $6, $7::uuid, $8) on conflict ("id") do update set "id" = $9::uuid, "type" = $10, "context" = $12, "state" = $11, "command_id" = $14, "scheduled_trigger" = $13, "metadata" = $16, "is_encrypted" = $15::uuid |

FIG. 9B

AUTOMATION FRAMEWORK FOR MONITORING AND REPORTING ON RESOURCE CONSUMPTION AND PERFORMANCE BOTTLENECKS

BACKGROUND

Technical Field

This application generally relates to techniques for monitoring and testing executing code.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for testing comprising: receiving a first command at a framework, wherein the first command includes first information identifying a first test to be executed and a first collector that collects data during execution of the first test; and responsive to receiving the first command, perform processing to execute the first command, wherein the processing is coordinated by the framework and wherein the processing includes: executing the first test; collecting test data, wherein the test data is collected by the first collector during execution of the first test; and generating a report regarding the test data collected while executing the first test. The first test may include executing a first data storage system management command on a control or management path.

In at least one embodiment, the framework may receive a first configuration file including a first test definition for the first test and including a first collector definition for the first collector. The first test definition may include a first test name of the first test and may include a reference to the first test configuration file describing the first test definition. The first collector definition may include a first collector name for the first collector and may include a reference to the first collector configuration file for the first collector. The first command may include the first test name identifying the first test, and the first command may include the first collector name identifying the first collector. The first test configuration file may describe one or more arguments used when executing the first test, and the first command may include one or more values corresponding to the one or more arguments.

In at least one embodiment, execution of the first test may be recorded in a first test log, and the first test configuration file may include one or more report definitions describing data items of the first test log included in corresponding report data of the report. A first report definition of the one or more report definitions may include matching criteria and a report data item, wherein the matching criteria may identify a pattern that is matched to a data item of the first test log, and wherein the data item matching the matching criteria may then be extracted from the first test log file and assigned to the report data item included in the report.

In at least one embodiment, the framework may include an orchestrator component that coordinates execution of a plurality of other components of the framework, and wherein the plurality of other components may include a collector controller that controls execution of the first collector, a test runner that controls execution of the first test, and a report generator that generates the report. The orchestrator component may coordinate sending the report data item from the collector controller to the report generator, and wherein the orchestrator component may coordinate sending other report data from the collector controller to the report generator. The other report data may be collected by the first collector. The orchestrator component may coordinate sending some report data from the test runner to the report generator as well. The first collector configuration file may include a first database table definition of a first table included in an archive database, wherein the first table may include data collected by the first collector. The framework may include a data archive component that receives first data collected by the first collector and stores the first data in the first table of the archive database. The first collector may include a first method or routine that is a first callback method or routine, and wherein the framework may call the first method or routine of the first collector during execution of the first test. The first collector may include a second method or routine that is a second callback method or routine, and wherein the framework may call the second method or routine of the first collector to identify command line arguments for the first collector. The first collector may include a third method or routine that is a third callback method or routine, and wherein the framework may call the third method or routine of the first collector to return the first data, that is collected by the first collector, to the data archive component. Processing performed may include executing a run analyzer of the framework to analyze the test data collected by the first collector.

BRIEF DESCRIPTION OF THE DRAWINGS

Features and advantages of the present invention will become more apparent from the following detailed description of exemplary embodiments thereof taken in conjunction with the accompanying drawings in which:

FIG. 4A is an example of a MAPS engine command in an embodiment in accordance with the techniques herein.

FIG. 4B is an example of a MAPS engine command log file in an embodiment in accordance with the techniques herein.

FIG. 4D is an example of a test log file in an embodiment in accordance with the techniques herein.

FIGS. 5A, 5B and 5C illustrate content that may be included in a main configuration file in an embodiment in accordance with the techniques herein.

FIGS. 6A and 6B illustrate content that may be included in a test configuration file in an embodiment in accordance with the techniques herein.

FIGS. 8A, 8B, 9A and 9B are examples of content that may be included in a generated report and also analyzed by the run analyzer in an embodiment in accordance with the techniques herein.

DETAILED DESCRIPTION OF EMBODIMENT(S)

Figure 1:
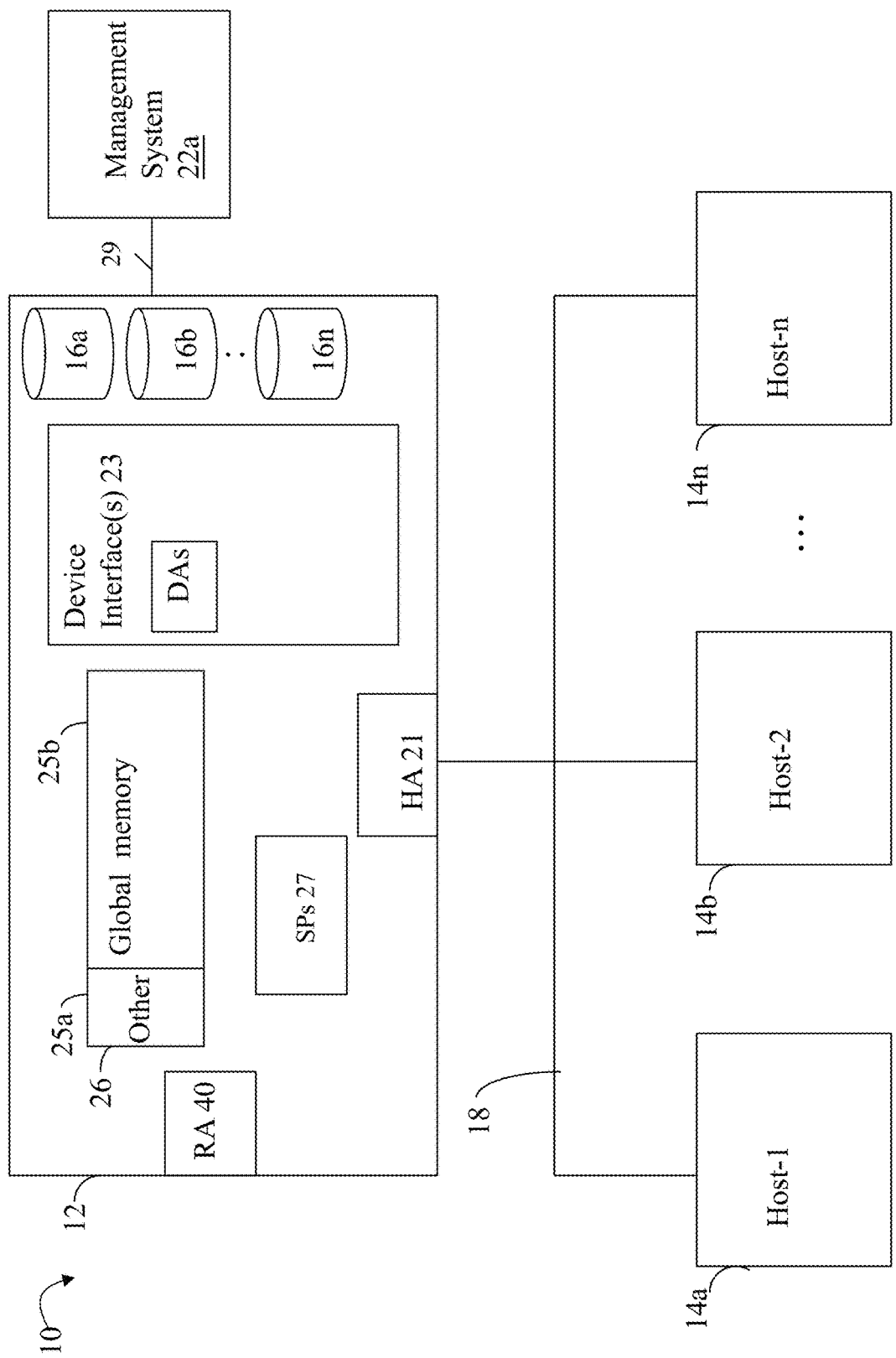
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other types of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example. As will be also appreciated by those skilled in the art, the techniques herein may also be more generally applied to other applications outside of the data storage area.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface(s) 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more types of device interfaces used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing. As a variation in connection with other embodiments as described herein, rather than implement the different controllers or adapters as individual hardware components, the functionality performed by the different controllers or adapters may be embodied generally in code that executes on one or more cores or CPUs.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system, as well as a high end or enterprise data storage system, such as a Dell EMC™ PowerMAX™ data storage system or a Dell EMC™ PowerStore™ data storage system. In at least some data storage systems such as the Dell EMC™ PowerStore™ data storage systems, the various components, such as the DA, FA, RA, and the like, as described above, may not be individual hardware components but may rather represent functionality performed by nodes of the data storage system. Additional details regarding such an embodiment with nodes performing processing of multiple components such as the DAs, FAs, and the like, are described in the following paragraphs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with the techniques herein may perform different data processing operations or services on data stored on the data storage system. For example, the data storage system may perform one or more data reduction operations, such as data deduplication and data compression. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication techniques are known in the art and any suitable such technique may be used in an embodiment in accordance with the techniques herein.

Figure 2:
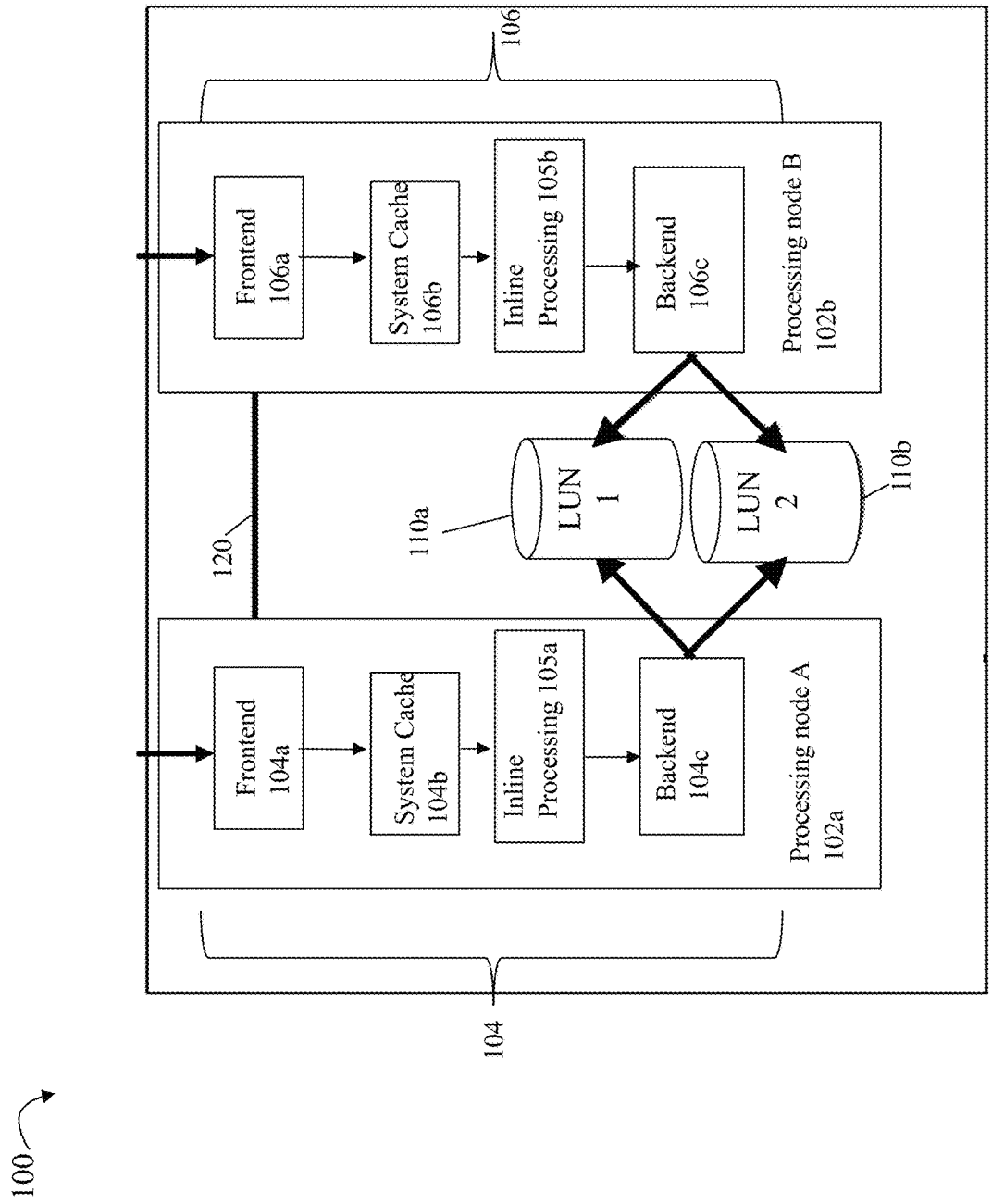
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 100, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with reading data from, and writing data to, physical storage 110a, 110b), inline processing may be performed by layer 105a. Such inline processing operations of 105a may be optionally performed and may include any one or more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data duplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by the component 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage.

When the processor performs processing, such as in connection with the inline processing 105a, 105b as noted above, data may be loaded from the main memory and/or other lower cache levels into its CPU cache. In particular, inline data deduplication (ILD) and inline compression (ILC) may be performed as part of the inline processing 105a, 105b. An embodiment may perform deduplication processing inline as part of the data path or I/O path. More generally, deduplication may be performed at any suitable time supported in an embodiment. For example, in at least one embodiment, deduplication processing may also be performed offline not as part of the data path or I/O path on data stored on BE PDs. An embodiment may perform compression processing inline as part of the data path or I/O path. More generally, compression processing may be performed at any suitable time supported in an embodiment. For example, in at least one embodiment, compression processing may also be performed offline not as part of the data path or I/O path on data stored on BE PDs.

In at least one embodiment, the data storage system may be configured to include one or more pairs of nodes, where each pair of nodes may be generally described and represented as the nodes 102a-b in the FIG. 2. For example, a data storage system may be configured to include at least one pair of nodes and at most a maximum number of node pairs, such as, for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. In such an embodiment as illustrated in FIG. 2, the functionality as described in connection with the different adapters as in FIG. 1 may generally denote a logical representation of the processing performed where such processing may be performed by code that executes on processing nodes rather than specific hardware components.

In connection with executing data storage system management commands or requests (sometimes simply referred to herein as management requests or commands), there may be excessive resource consumption as well as performance bottlenecks. For example, a user, such as a data storage manager or administrator, may issue a management command to create a large number of volumes or LUNs in a data storage system, or to establish a large number of replication sessions. The user may observe adverse performance effects from executing the management command. For example, it may take an unexpectedly long time to complete execution of the management command. Additionally, other processing and tasks executing on the data storage system may be noticeably slower while the system performs processing to service the management command. Efforts to further analyze and identify potential causes of the adverse performance impact may include manually taking steps to reproduce the problem while also manually collecting a wide variety of information. The manual steps may include interactively observing performance and resource consumption metrics while the management command is being executed. Some existing techniques include manually writing and executing a specific script to facilitate test execution and data collection. The results of the script execution may subsequently be manually analyzed or perhaps analyzed by execution of another customized script. Unfortunately, the foregoing scripts written for test execution, data collection and analysis may be limited in terms of reusability. Additionally, manually writing such customized scripts as noted above introduces the additional potential for human error. Thus, the foregoing existing techniques can be inefficient, error prone and time consuming.

Described herein are techniques that facilitate collection, measurement and reporting on resource consumption and performance. In at least one embodiment, a testing and data collection framework, system or engine may systematically measure and collect various indicators and metrics while executing one or more tests. In at least one embodiment, the framework, system or engine may automatically generate reports that include graphical or tabular data. The framework, system or engine may automatically perform an analysis of the test execution and data collected. The reports and other information collected regarding test execution may be archived allowing for historical and trend analysis.

In at least one embodiment, the testing framework supports pluggable data collectors, tests, data archivers and report generators using, respectively, a set of definitions for collectors, tests, data archivers and report generators. Reports may be automatically generated based on a combination of report data definitions and pluggable test results to report data mappers. Additionally, the framework may support environment setup including running steps to customize the testing system environment.

In at least one embodiment, processing performed by the engine may be initiated in multiple ways including a command line and a GUI. The embodiment may support testing sessions that include executing multiple MAPS command test runs with batch mode execution. For example, a file may be specified that includes information for multiple MAPS engine command executions. In at least one embodiment, multiple integrated tests may be currently available for execution by the engine or framework, where the required components needed to execute such integrated tests are currently included in the framework or engine. An embodiment may also allow a user to execute a non-integrated test which is currently not integrated in the system. In one aspect, a non-integrated test may be a new or customized test. For example, the user may define their own new customized test and provide the necessary components, such as a test definition and configuration, to execute the test within the engine or framework that facilitates data collection, analysis and reporting of the customized test. In at least one embodiment, a test, such as an integrated test, may also be executed in a supported interactive manual mode where the user issues control commands in an interactive testing session or run. The control commands for the interactive manual mode may include a start command to start or initiate execution of a test and commence data collection. The control commands may include a stop command to stop data collection and testing, and proceed with subsequent post processing. The stop command may be issued, for example, when executing a test prior to completion of the entire test in order to facilitate data collection for only a particular desired part of the test. The techniques herein are flexible and are described for use in connection with resource consumption and performance bottlenecks. More generally, the architecture and design of the framework in accordance with the techniques herein is highly extensible and may be used in connection with collecting other types of data and executing any desirable test through the supported use of customized pluggable data collectors and tests.

In at least one embodiment as described in the following paragraphs, the techniques herein may be used in connection with the control path or management path performance and resource consumption in a data storage system. However, more generally, the techniques herein may be used in connection with any suitable system and with any type of data collection and analysis.

The foregoing and other aspects of the techniques herein are described in more detail in the following paragraphs.

In the following paragraphs, an embodiment of the techniques herein may be referred to as a MAPS (Measuring Automated Performance Statistics) framework, engine or system. Examples in the following paragraphs may also refer to the control path or management path performance and resource consumption in a data storage system. However, more generally, the techniques herein may be used in connection with any suitable system and with any type of data collection and analysis.

As an example, a user of a data storage system may notice that it takes an unexpectedly long time to complete execution of one or more management commands that create and provision storage for a large number of LUNs, or delete a large number of LUNs. As such, it may be desirable to use the techniques described herein to monitor and analyze resource consumption and performance when executing the data storage system management commands that create a large number of LUNs, such as 500 LUNs. Additionally, it may be desirable to use the techniques described herein to monitor and analyze resource consumption and performance when executing the data storage management commands that delete a large number of LUNs, such as 500 LUNs. Described in the following paragraphs below is an example illustrating use of the techniques herein with an integrated test of the MAPS engine, where the integrated test may be referred to as the volumes test, and where the volumes test includes execution of such management commands to create and then delete a large number of LUNs.

When executing the foregoing management commands with respect to a large number of LUNs in at least one embodiment in accordance with the techniques herein, the MAPS framework described in the following paragraphs may be used to monitor resource consumption and performance in the data storage system. The resources monitored for consumption may include, for example, one or more CPUs, memory and/or cache. Additionally, the CPU and memory resources may be consumed by particular components during the execution of the management commands. Thus, the MAPS framework may also provide a finer granularity of monitoring resource consumption with respect to particular components or processes. For example, the CPU resources may be consumed by particular components as reflected by monitored execution times associated with performing particular operations or tasks by multiple different processes or components.

In at least one embodiment, the management commands may be implemented or serviced using code executed on the data storage system, where at least some of the code is written in the Java programming language. More generally, the techniques herein may be used in connection with code written in any programming language. Additionally, when implementing or servicing the management commands, data storage system configuration information as well as other information stored in the data storage system configuration database (DB) may be updated. For example, as each new LUN is created, one or more tables in the data storage system configuration DB describing the current data storage system configuration are modified to reflect the newly created LUN. In at least one embodiment, the data storage system configuration DB may be an SQL database, such as PostgreSQL, also known as Postgres, which is a free and open-source relational database management system emphasizing extensibility and SQL compliance.

In at least one embodiment using the MAPS engine described herein when executing the volumes test, the CPU and memory resource consumption information may be collected and analyzed at a system wide level (e.g., per node and per appliance) as well as at finer granularities of smaller components. For example, for a data storage system or appliance in the active-active two node configuration as described in connection with FIG. 2, the CPU and memory resource consumption information may be collected and analyzed at the node level (e.g., per node), as well as at a lower component level such as regarding resource consumption in connection with executing Java code on a Java Virtual Machine (JVM), when performing garbage collection in Java, and when executing code of the data storage system configuration DB. Further, data collected for such resource consumption may also be at the per process or method level.

As known in the art, Java garbage collection (GC) is the process by which Java programs perform automatic memory management. Java programs compile to bytecode that can be run on a JVM. When Java programs run on the JVM, objects are created on the heap, which is a portion of memory dedicated to the program. Eventually, some objects will no longer be needed. The garbage collector generally finds these unused objects and deletes them to free up memory for reuse. For example, unreferenced objects in Java may be identified and marked as ready for garbage collection. Subsequently, the marked objects are deleted. Additionally, memory may also be compacted after the object is deleted so that remaining existing objects are in a contiguous block at the start of the heap. The compaction process generally facilitates memory allocation of new objects sequentially after the block of memory allocated to existing objects.

Figure 3A:
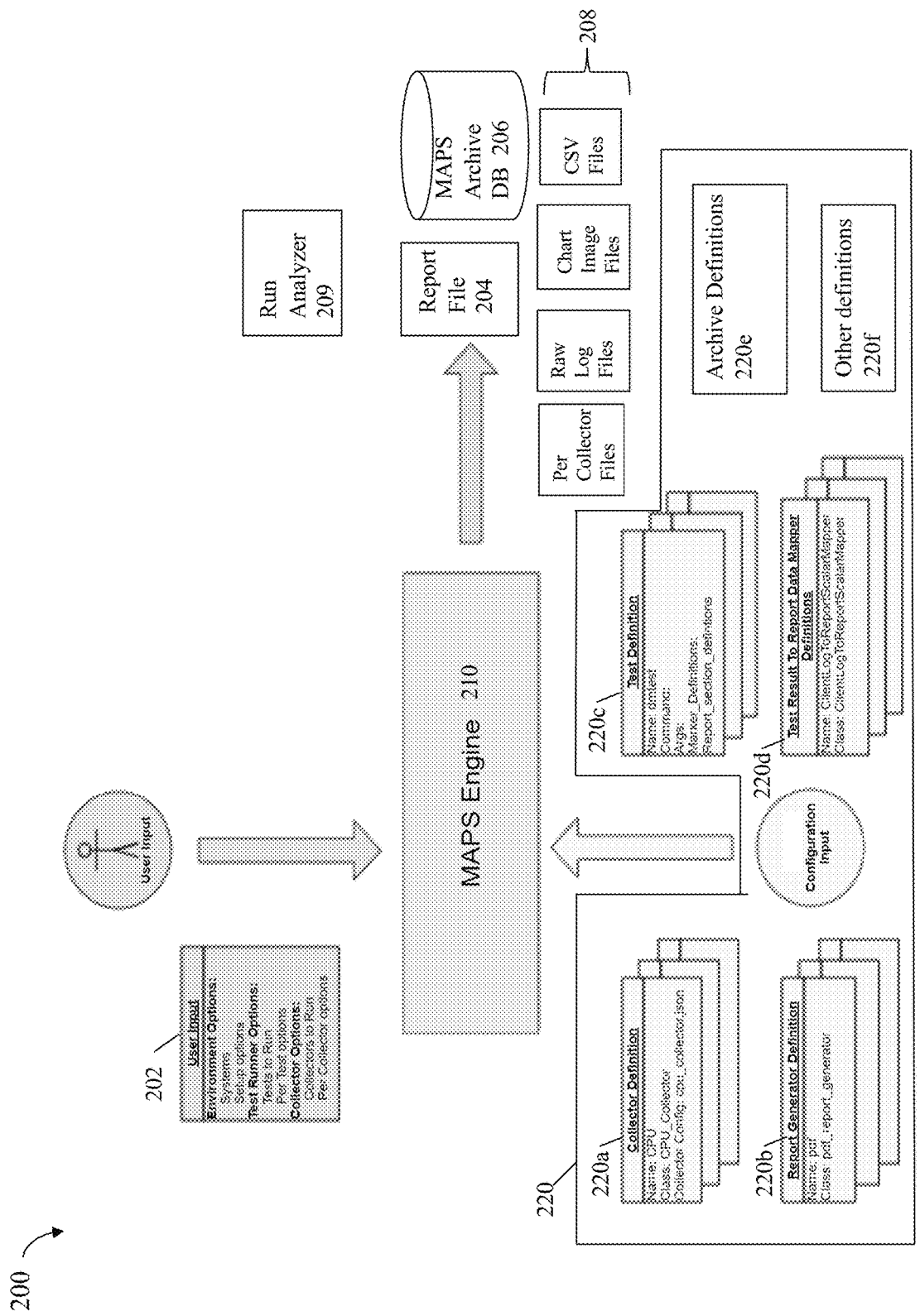
FIGS. 3A, 3B and 3C are examples illustrating components of a MAPS (Measuring Automated Performance Statistics) engine and associated data flows in an embodiment in accordance with the techniques herein.

Referring to FIG. 3A, shown is a diagram illustrating the high level inputs and outputs of the MAPS engine in an embodiment in accordance with the techniques herein. The example 200 includes the MAPS engine 210, user input 202, configuration input 220, file report 204, the run analyzer 209, MAPS archive DB 206 and the various files 208 output by the MAPS engine 210.

The user input 202 provided to the MAPS engine 210 may include environment options (e.g., what system to run the test on, a location or directory of where to place the outputs generated from the test execution or run by the MAPS engine, what particular version of software such as for an operating system, library or firmware should be installed and running on the system when the test is run), test runner options (e.g., what one or more tests to run, and providing any test inputs or options), and collector options (e.g. what collectors to run and thus data to collect, what metrics to collect, and providing any collection inputs or options). Generally, the environment options may include the particular hardware and software environment to be set up on the data storage system prior to executing the tests. Thus, the tests are executed in the particular environment specified by the environment options. In at least one embodiment, each of the tests may include executing one or more control path or management commands such as one or more data storage system management commands. For example, as described in more detail elsewhere herein, one test available for selection may include creating a specified number of LUNs and then deleting those same LUNs. During the test execution, various collectors may be executing and collecting desired information regarding resource consumption and performance.

The configuration input 220 may include collector definitions 220a defining the different data collectors, report generator definitions 220b defining the different reports (e.g., providing templates for different reports), test definitions 220c providing definitions for the various tests available for execution, test result to report data mapper definitions 220d (identifying a mapping between test results and data included in the generated report file 204), archive definitions 220e providing definitions for the different tables included in the MAPS archive DB 206 and possibly other definitions 220f. At least some of the foregoing definitions 220a-f may be included in configuration files described in more detail elsewhere herein.

In at least one embodiment, a test definition 220c may include a test definition name, a command identifying a particular script that is executed for the test, a location (e.g., directory) of the script to be executed for the test, the arguments exposed to the user (e.g., where the user can provide values for the arguments as inputs to the test), marker definitions (e.g., identifying a type of marker, where to get the marker data from such as a log file, and how to identify the marker in the log file), and report section definitions (e.g., an array of report data definitions that can use the test result to report data mappers 220d to map a test result data item of the test log file to a particular report data item). The test definition 220c as well as other items from FIG. 3A are described in more detail in the following paragraphs.

The MAPS engine 210 performs processing in accordance with the user input 202 and the configuration input 220. In particular, the MAPS engine executes at least one specified test (as identified by the test running options of the user input 202) and, while executing the at least one specified test, collects data based on the one or more collectors activated for execution (as identified in the collector options of the user input 202). As a result of executing the test, information 208 is collected by the collectors. The information 208 may include multiple types of files such as collector specific files or per collector files, raw log files of the test executed, chart image files and CSV (comma separate value) files with collected metrics. Subsequently, after the test has completed, the MAPS engine 210 generates a report file 204 based on the collected information 208. Additionally, suitable portions of the collected information 208, as well as other information generated during execution of the tests and MAPS command, may be included in the MAPS archive DB 206, which may be a DB or other suitable data repository. Generally, the report file 204 provides a report on the metrics gathered by the collectors for the currently selected tests.

The MAPS archive DB 206 may denote a historical accumulation of data collected over time from various executions or runs by the MAPS engine executing MAPS commands and tests.

The run analyzer 209 may analyze various outputs generated in connection with execution of the MAPS command and the one or more tests run. For example, the run analyzer 209 may analyze the report file and/or other output files 208 to identify abnormalities or anomalies, bottlenecks or apparent bottlenecks, and processes and other components consuming excessive amounts of resources. The foregoing are a few examples of the types of analysis that can be performed by the run analyzer 209. Additional examples are described elsewhere herein.

Consistent with discussion herein, the MAPS engine 210 is an extensible framework that facilitates automation in connection with data collection, reporting and analysis while running one or more tests. From a high level, a session or MAPS command execution run within the MAPS engine may be partitioned into the following steps, where each such step may also include optional sub-steps:

1. Setup Environment. This step performs any needed setup regarding the system environment for the session or run of tests executed using the MAPS engine.

2. Start Data Collection. The steps initiates data collection by one or more data collectors.

3. Execute Test(s). This step executes one or more tests, where during such test execution, the desired data is automatically collected by the one or more collectors activated in step 2.

4. Stop Data Collection. This step stops data collection by the one or more data collectors.

5. Gather Collected Data. This step may include aggregation of the collected raw data. For example, depending on the collector some of the data and logs may be multiple nodes of the appliance. In this case, the Gather Collected Data step may include aggregating the various raw data and/or log files from the various nodes before the MAPS engine moves to the post processing step.

6. Post Processing. This step may include any desired additional processing. For example, post processing may include deriving additional desired metrics from the raw collected data.

7. Clean Up. This step may include any desired cleanup such as, for example, removing temporary work files.

8. Report Generation. This step generates a report regarding the testing session or run.

9. Run analysis. This step includes further analysis of the collected data.

10. Data Archiving. This step may include archiving the collected data, generated report, and run analysis in the MAPS Archive DB.

Figure 3B:
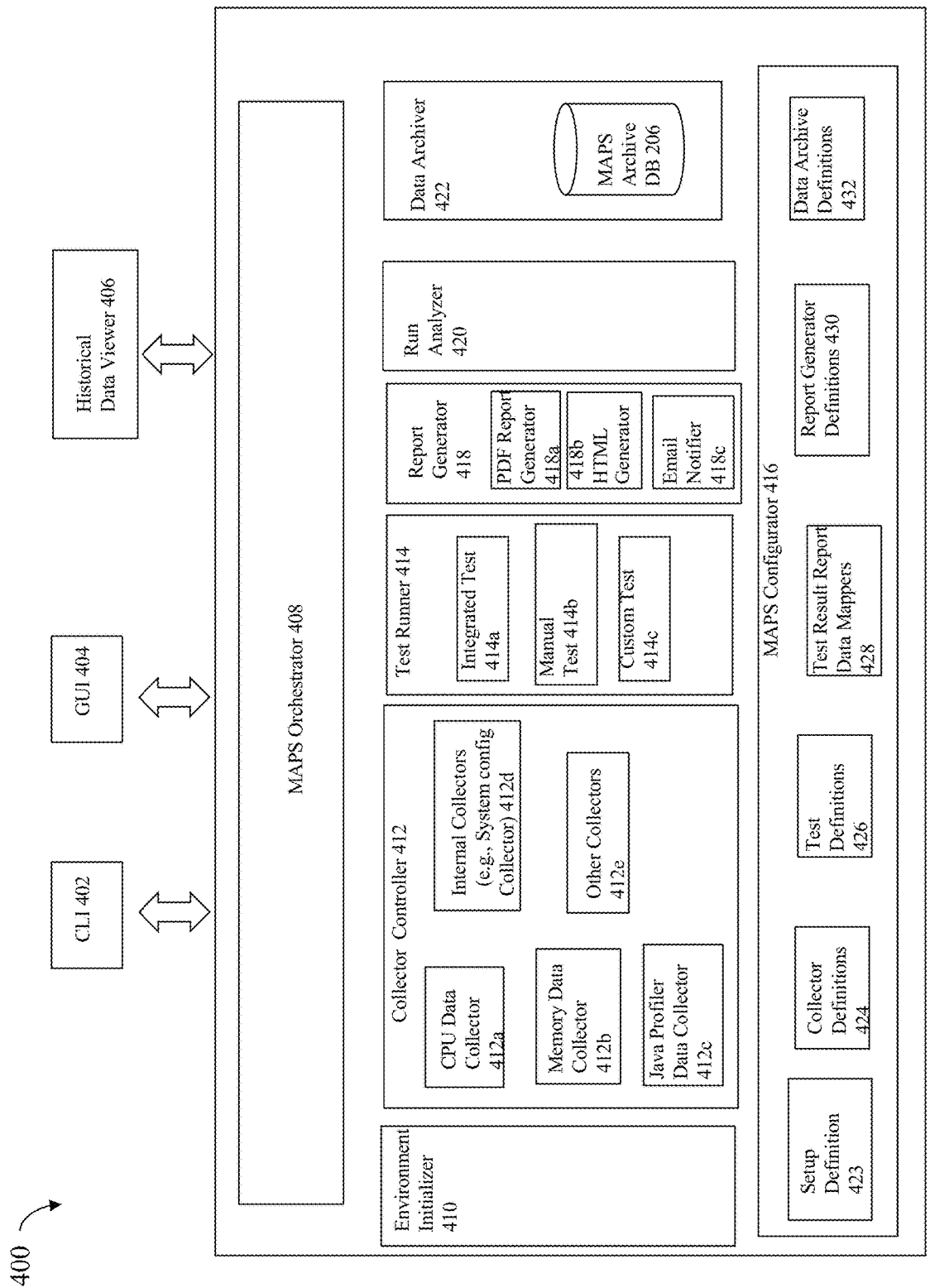

Referring to FIG. 3B, shown is an example providing further detail regarding components of the MAPS engine in at least one embodiment in accordance with the techniques herein. The example 400 provides additional detail regarding the MAPS engine 210 and configuration input 220 of the FIG. 3A.

The example 400 illustrates an embodiment of the MAPS engine that provides support for a command line interface (CLI) 402 and a GUI 404. For purposes of illustration, examples in the following paragraphs illustrate use of the CLI to perform a run or session using the MAPS engine. The historical data viewer 406 may be included to view archived data of the MAPS archive DB 206.

The MAPS engine of the example 400 includes the MAPS orchestrator 408, environment initializer 410, collector controller 412, test runner 414, report generator 418, run analyzer 420, data archiver 422 and MAPS configurator 416.

The MAPS orchestrator 408 coordinates processing performed during a session or run when executing a MAPS engine command using the MAPS engine. The processing coordinated by the MAPS orchestrator 408 may be performed by the other components of the MAPS engine.

The environment initializer 410 performs processing for the step 1 noted above to setup the environment of the system in which the one or more selected tests will be executed. The environment initializer 410 may also perform any desired customized setup. For example, the environment initializer 410 may perform processing to install a particular version of software or a library for use when executing the one or more tests.

The collector controller 412 performs processing that controls individual collectors. For example, the collector controller 412 may perform processing to setup a data collector, start the data collector, stop the data collector, gather the data recorded by the data collector, and sending any needed gathered data to the report generator 418. The collector controller 412 may also communicate with the individual data collectors and tell the individual data collectors (that may be enabled for the test session or run) to perform any needed cleanup and post processing. In at least one embodiment, the collectors available to perform data collection during a test session or run may include a CPU data collector 412a that collects CPU resource consumption information, memory data collector 412b that collects memory consumption information, Java profiler data collector 412c that collects performance and other information regarding execution of the JVM, one or more internal collectors 412d that are used internally within the MAPS engine (i.e., an internal collector is not exposed to the user of the MAPS engine), and other collectors 412e. As described in more detail elsewhere herein, a user may select one or more collectors that perform data collection when executing one or more selected tests. The collectors 412a-e may be predefined collectors included in the MAPS engine. Additionally, as described in more detail elsewhere herein, a user may define and configure a new collector that may perform data collection while executing a test.

In at least one embodiment, the following may be predefined collectors included in the MAPS engine:

1. A CPU collector that collects CPU processor usage information. This may be at a high level per CPU or per node as well as other levels of granularity. In at least one embodiment, the CPU collector may also optionally collect per process CPU consumption.

2. A memory collector collects memory usage information. Memory consumption may be tracked per process. Memory consumption related to the JVM memory usage such as of the heap may be tracked over time. In at least one embodiment, a data container or other logical grouping may be defined denoting a logical grouping of executing processes. In at least one embodiment, one or more containers may be defined where each such container denotes a different group of processes running in the system. For example, in the data storage system, a control path container may include all the control path management processes executing the data storage system, a second container may include are service related processes, a third data container may include the data path processes, and the like. The particular containers may vary with embodiment and may be configurable in an embodiment. Resource consumption such as memory consumption may be tracked by the memory collector per data container.

3. A Postgres or DB collector (also referred to as the pg_stat data collector herein) may collect information regarding the data storage system configuration DB. For example, information for each specific SQL query made to this DB may be tracked, where the information may include the mean query time, the number of times or count that the particular SQL query is performed, and the total time that a particular query was executed (e.g., if the same query is executed 10 times and it takes 10 milliseconds, then the total time for the query is 100 milliseconds). The queries may be ranked, from highest to lowest, in a first ranking based on mean query time and in a second ranking based on total time and the top 50 of the first and second rankings may be reported upon by the DB collector. Such information regarding the DB queries may be useful for a variety of different reasons some of which are discussed herein. For example, the run analyzer may detect that a count or frequency of a particular query to read from the DB is high or above a specified threshold. As a result of this analysis, the control path code may be modified to include an optimization to reduce the frequency of this query when performing one or more management commands. For example, an optimization may be performed to cache the results of the query when possible for subsequent reuse rather than to repeatedly issue the same DB query to read from the DB. For example, in connection with creating a particular LUN, processing performed may include querying the data storage system configuration DB to see if the particular LUN already exists.

4. A Java CPU profile collector may collect CPU consumption or usage information for a Java method or process. Described elsewhere herein is a java_profile collector which may collect Java CPU profile information as well as Java memory profile information in connection with Java methods or processes.

5. A Java memory profile collector may collect memory consumption or usage per Java method or process.

6. A system configuration collector may collect information about the system upon which the MAPS command is being executed. The information collected may include, for example, the operating system version, the version of particular libraries or firmware, the model of the system, and the like.

7. A Java GC collector (also referred to as the java_gc collector elsewhere herein) may collect metrics regarding garbage collection performed by the JVM.

8. A marker collector may collect marker timestamps or points in time associated with defined markers. For example, markers may be used with the volumes test execution. In particular a first marker may be associated with a first time stamp in the volumes test log file 602 of FIG. 4C denoting when the test is starting to create the 500 volumes, a second marker may be associated with a second time stamp in the volumes test log 602 denoting when the test is done creating all 500 volumes, a third marker may be associated with a third time stamp in the volumes test log 602 denoting when the test is starting to delete the 500 volumes, and a fourth marker may be associated with a fourth time stamp in the volumes test log 602 denoting when the test is done deleting the 500 volumes. Markers and uses thereof in an embodiment are described in more detail elsewhere herein.

9. A locking metrics collector may collect metrics regarding a locking service where locks are used internally by the control path when implementing or servicing a management command. The locks may be used generally for control and synchronization purposes. A lock may be taken, for example, to synchronize access to a DB table or table entry storing data storage configuration information in the data storage system configuration DB 606. In at least one embodiment, the locks themselves may be implemented internally using DB tables and entries of the configuration DB 606. To further illustrate, the locking service may keep all the locks that have been granted (or are pending) in one or more DB tables in the configuration DB 606. If system restarts or is rebooted, the state of all the locks are persisted over the reboots. As locks are requested, the locking service may use these DB tables to perform queries to determine whether a particular lock can be granted or if the particular lock is already granted to another process, thread or component. The locking service also accordingly updates the DB tables of locks as locks are granted and released. In at least one embodiment, the locking metrics collector may be implemented as a MAPS engine internal collector having a definition that is not exposed outside of the MAPS engine. In this case, the collector locking related data may always be collected by the locking metrics collector whereby the user is not provided a command line option to turn on or off the locking metrics collector.

As an example regarding use of the locking service and locks, when creating a new LUN or deleting an existing LUN, one or more READ locks may be requested and one or more WRITE locks (e.g., exclusive access request lock) may be requested. To further illustrate, when creating a new LUN, READ locks may be requested for the following resources associated with the LUN being created: the data storage system or appliance, one or more policies such as a protection policy (e.g., defining data protection policy related to RPO (recovery point objective) and RTO (recovery time objective) and a performance policy (e.g., defining service level objectives)), and a host group or a host to which the LUN will be exposed for I/O. Additionally, the newly created LUN may be included in a logical volume group where processing the create LUN command may request a WRITE lock for the volume group to which the new LUN is added. In at least one embodiment, all the foregoing locks may be requested at the beginning of the create LUN command and released at the end. When deleting a LUN, WRITE locks may be requested, for example, for the LUN being deleted, and any associated snapshot or clones to that LUN being deleted. In at least one embodiment, all the foregoing locks may be requested at the beginning of the delete LUN command and released at the end. In an embodiment there may be additional or different locks taken than those noted above. However, it can be seen how creating and deleting many LUNs as with the volumes test described herein may generate many locking requests each potentially requiring queries and updates to the data storage system configuration DB 606.

10. A logging metrics collector may collect information regarding one or more different log files. For example, an embodiment may include a system log file that logs events, a MAPS session or command log file (e.g., 610 of FIG. 4C) that logs the processing performed in connection with executing a MAPS system command, and a test log file (e.g., 602 of FIG. 4C) when executing a test using the MAPS system. The logging metrics collector may collect metrics regarding, for example, the average number of entries logged in the system log per defined period of time (e.g., such as per day), the average log file size, and the like.

11. The DB interaction collector may collect DB transaction level information where a transaction may include performing multiple steps or DB operations. A transaction may include multiple database operations, such as multiple updates to multiple tables, where all database operations of the transaction may be performed autoimcally as a single operation.

The test runner 414 performs processing to execute the selected one or more tests specified in a MAPS command. A test selected for execution may be an integrated test 414a, manual test 414b or a custom test 414c. Consistent with other discussion herein, an integrated test 414a may be a defined existing test that is already configured for use with the MAPS engine. In this case, the user may simply issue a command to invoke the MAPS engine, where the command identifies the integrated test, along with any necessary or desired arguments, to be run. A manual test 414b refers to execution of a test in a manual control mode where the user may issue control commands interactively to control processing performed during the session with the MAPS engine. A manual test 414b may, for example, run an integrated test such as the volumes test in this interactive manual control mode. In at least one embodiment, the manual test mode may also be used to perform other operations that are not included in the test itself. For example, manual test mode may support issuing commands to increase system workload either through issuing a supported manual test mode command or otherwise invoking another file interactively to execute commands that increase the workload. A custom test 414c refers to a non-integrated new customized test where the user provides the needed files for the test to execute under the control of the MAPS engine. For example, for a custom test, the user provides the body of the actual test definition in a new test configuration file without adding a corresponding new definition for the test in the MAPS configuration file. The MAPS configuration file may generally be characterized as a configuration file for the MAPS engine or system and includes high level definitions of data collectors and integrated tests available to a user of the MAPS engine. The MAPS configuration file is described in more detail elsewhere herein such as in connection with FIGS. 5A, 5B and 5C.

In at least one embodiment, the custom non-integrated test may then be invoked by suitable MAPS command line options such as by including the following:
-tests custom -custom_config MYTEST.config
where:
"-tests" is the MAPS command line test flag indicating that a list of tests to be executed immediately follows "-tests" on the command line;
"custom" indicates that the type of test is custom;
"-custom_config" is the MAPS command line flag indicating that a test configuration file for the custom test immediately follows "-custom_config" on the command line; and
"MYTEST.config" is the name of the test configuration file for the customized test. Additionally, the user may add a new integrated test. For example, the above custom test may be subsequently integrated into the MAPS engine by additionally modifying a MAPS configuration file that provides a new test definition. The MAPS configuration file may identify the name by which the new test may be referenced on the MAPS command line and may include a pointer or reference to the new test configuration file (as provided by the user). The new test definition may be added to the test definitions sections of the MAPS configuration file as described in connection with element 944 of FIG. 5C elsewhere herein.

The report generator 418 takes various report sections and corresponding report data (e.g., text, tables, graphs) and produces a report. In at least one embodiment, the report may be generated in one or more different forms. For example, an embodiment may generate the report as a PDF (portable document format) file using the PDF report generator 418a, or as an HTML (hypertext markup language) file using the HTML report generator 418b. Additional report generators that generate different output types besides HTML and PDF may be included in an embodiment. The report generator 418 may also provide the report to recipients via electronic mail (e-mail) using the email notifier 418c.

The run analyzer 420 analyzes the MAPS sessions and test runs performed using the MAPS engine. The run analyzer 420 may, for example, detect anomalies or abnormalities in test runs, compare multiple test runs, and the like.

The data archiver 422 may archive data from the different MAPS command runs in the MAPS archive DB 206. The data archived by the data archiver 422 may include the raw collected data, generated reports, run analysis information, and the like. For simplicity, FIG. 3B show only the MAPS archive DB 206 as a single data archive. More generally, similar to how an embodiment may "plug in" different report generators 418a-c, an embodiment may also have multiple data archivers. For example, as discussed herein, the MAPS archive DB 206 may be a postgres DB. However, an embodiment may also include different data archiver for use with different types of databases. For example, an embodiment may include a second data archiver with its associated data archive definition, where the second data archiver archives data to a My SQL DB, an Oracle DB, or a NoSQL DB. A third data archiver may not archive data to a database. Rather, the third archiver may generate one or more large compressed files, such as zip files, from the desired collected and/or generated data, where the one or more large files may then be moved to another data storage system serving as the archive location.

The MAPS configurator 416 may provide configuration files to various other components of the MAPS engine. The MAPS configurator 416 may store, manage and provide configuration files including various definitions to components of the MAPS engine. The configuration files may include setup definitions 423 (e.g., used by the environment initializer 410 to initialize the system testing environment), collector definitions 424 (e.g., used by the collector controller 412 to define the different collectors), test definitions 426 (e.g., used by the test runner 414 to define the tests available for execution and also indicate what test data is included in the generated report), test result report data mappers 428 (e.g., used to extract test data and map the test data to corresponding report data included in a generated report), report generator definitions 430 (e.g., used by the report generator 418 to define various report templates or types of report files such as PDF or HTML report output files), and data archive definitions 432 (e.g., defining the schema for the MAPS archive DB and providing definitions of the various tables and entities of the MAPS archive DB 206). As noted above, the data archive definitions 432 may also include definitions or templates for the different types of data archives and associated data archivers that may be supported in an embodiment.

Figure 3C:
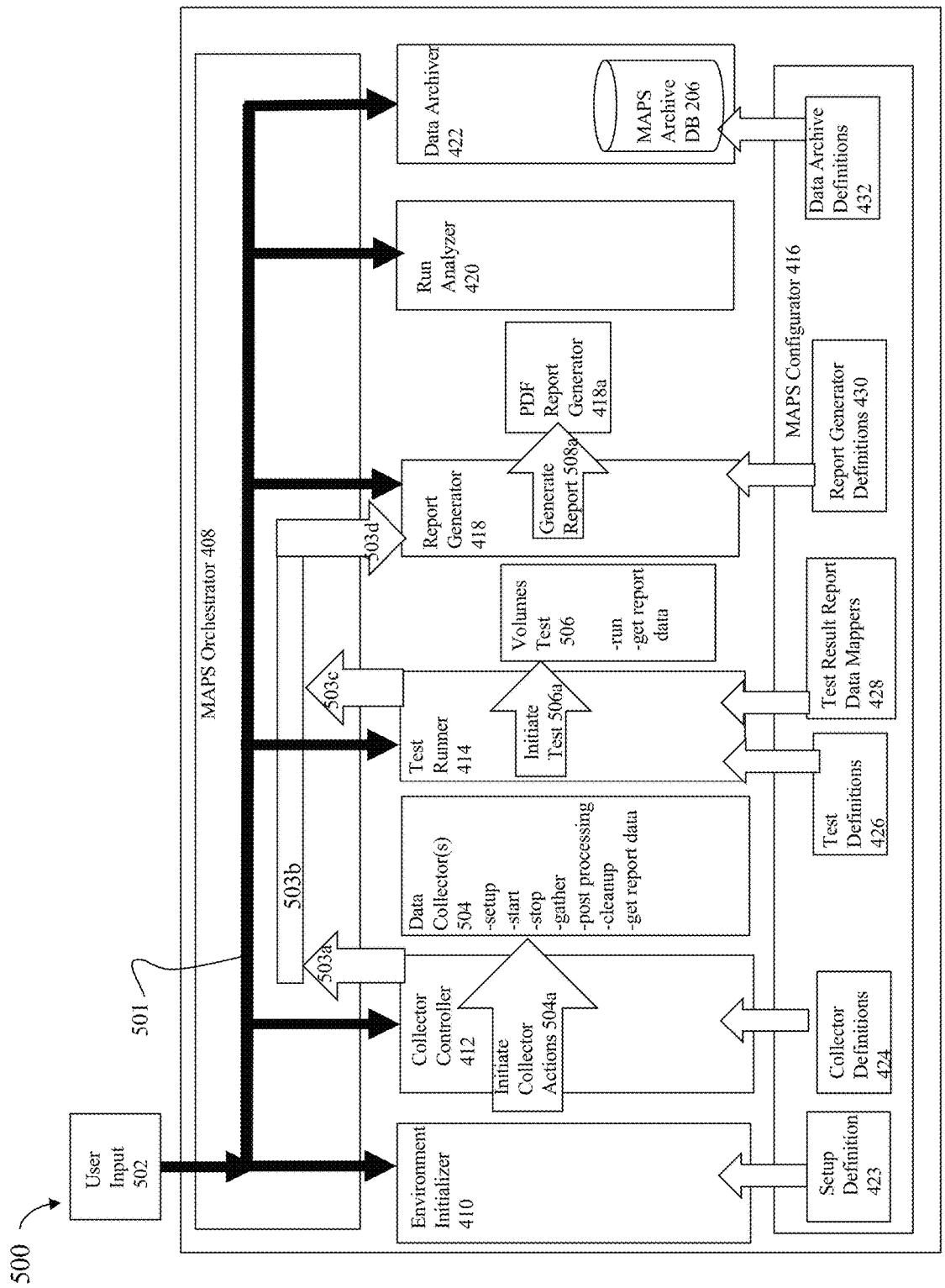

Referring to FIG. 3C, shown is an example 500 illustrating data flow in the MAPS engine in connection with user input and report generator data in an embodiment in accordance with the techniques herein. The example 500 includes similarly numbered components as in the example 400. Additionally, the element 501 denotes the solid black arrows illustrating the data flow of user input to the various components of the MAPS engine; and the elements 503a-d denote arrows illustrating the flow of data used by the report generator 418 to generate reports. As illustrated by the arrow 501 and consistent with other discussion herein, user input 502 (such as provided through the CLI 402 of FIG. 3B or GUI 404 of FIG. 3B) may include input provided to the environment initializer 410, collector controller 412, test runner 414, report generator 418, run analyzer 420 and data archiver 422.

User input 502 may be provided that identifies setup or initialization customizations to be made. In at least one embodiment, the user input 502 may identify a setup configuration file that includes a setup definition 423 to be used. The setup definition 423 may be provided to the environment initializer 410 to provide the additional customized initialization and setup steps. For example the setup definition file 423 may include a command or script that is executed to install a particular library or software version to be used when running a selected test.

User input 502 may be provided that identifies one or more data collectors and associated metrics, where the data collectors are activated to collect the associated metrics when executing one or more tests. The MAPS orchestrator 408 communicates with the collector controller 412 at various times during the MAPS session or run to initiate collector actions 504a for the one or more data collectors identified in the user input 502. For example, consistent with other discussion herein and as noted in the element 504, actions initiated and performed for each data collector that is specified on the MAPS command and that performs data collection may include: setup (i.e., collector-specific setup), start (to start data collection), stop (to stop data collection), gather (to gather or aggregate the collected data), post processing, cleanup, and get report data (to get report data from the collected data, where the report data is sent 503a to the report generator 418 and included in the generated report). The collector controller 412 may communicate with the MAPS configurator 416 to obtain collector configuration files including the desired collector definitions 424 for those data collectors of the user input 502 selected for use when executing the one or more tests.

User input 502 may be provided that identifies one or more tests (and any specified test arguments or inputs) to be executed in the MAPS session or run. The MAPS orchestrator 408 communicates with the test runner 414 to initiate execution of the one or more tests 506a. For example, the user input 502 received by the MAPS orchestrator 408 may indicate to execute the volumes test 506. The orchestrator 408 communicates with the test runner 414 regarding the selected volumes test 506 to be executed, whereby the test runner 414 performs processing to initiate 506a execution of the volumes test 506. The test runner 414 may communicate with the MAPS configurator 416 to obtain test configuration files including the desired test definitions 426 for the tests to be executed. For example, the volumes test 506 may have a corresponding test configuration file with a test definition 426. After the volumes test 506 is run, test data may be gathered and mapped to corresponding report data item(s) to be included in the generated report. In connection with gathering the report data, the test runner 414 may use test result report data mappers 428 that generally map test data items to corresponding report data items. The test result report data mappers 428 are described in more detail elsewhere herein. The element 503c denotes the report data sent from the test runner 414 to the report generator 418, where the report data is included in the generated report.

User input 502 may be provided that identifies the particular report generator used when generating the report for the MAPS session or run. The MAPS orchestrator 408 communicates with the report generator 418 to generate 508a the desired report at the appropriate time. In at least one embodiment, the user input 502 may identify the particular report generator configuration file including the report generator definition 430 to be used when generating the report 508a. For example, the user input 502 may identify a report generator definition file 430 used by the PDF generator 418a to generate the report as a PDF file. The report generator definition file 430, such as for the PDF generator, may identify the particular command (with any desired command options) to execute to obtain the desired PDF report file. In at least one embodiment described in more detail herein, the one or more test definitions 426 used in a MAPS run or session indicate the test data included in the generated report.

User input 502 may be provided that indicates whether to execute the run analyzer and analyze the test runs and collected data from the current MAPS session. Additionally, in some embodiments supporting multiple types of optional analysis, the user input 502 may identify the one or more types of analysis performed on the test runs and collected data from the current MAPS session. Although not illustrated in the FIG. 3B or 3C, the MAPS configurator 416 may also manage analysis configuration files that include one or more analysis definitions regarding the different types of analysis that may be optionally performed on the test runs. Each analysis definition for one type or group of analysis may, for example, identify a script, program or command executed to perform the analysis. For example, a first analysis definition included in a first analysis configuration file may identify a first script, program or command executed to perform an analysis of the test runs and collected data regarding CPU resource consumption; a second analysis definition included in a second analysis configuration file may identify a second script, program or command executed to perform an analysis of the test runs and collected data regarding memory resource consumption; and a third analysis definition included in a third analysis configuration file may identify a third script, program or command executed to perform an analysis of the test runs and collected data regarding DB queries performed with respect to the data storage system configuration DB. To further illustrate, the third script, program or command may examine the test runs and collected data to identify the particular DB queries executed that have the highest counts or frequencies, the particular DB queries executed that have the largest mean execution time, and the like.

User input 502 may be provided that indicates whether to archive any information or collected data from the current MAPS session. Additionally, the user input 502 may identify only selected portions of the collected data from the current MAPS session for archiving in the MAPS archive DB 206.

Although not illustrated in FIG. 3C but consistent with other discussion herein, data collected by the collectors, data from the test run(s) and/or the generated report may be provided as inputs to the run analyzer 420 and the data archiver 422.

Referring to FIG. 4A, shown is an example 1000 of a MAPS command line that may be used in an embodiment in accordance with the techniques herein. The command line 1000 may be the user input 502 to the MAPS engine, where the user input 502 is provided to the MAPS engine, for example, using the CLI 402.

It should be noted that the particular syntax, command line options and arguments of FIG. 4A are merely examples illustrating one particular implementation of a defined CLI.

Generally, any suitable syntax, command line options and arguments may be used. Additionally, the particular command line of FIG. 4A illustrates use of only some of the options and arguments that may be included in a command line to invoke desired data collectors, tests and other components of the MAPS engine. A fully implemented CLI may include other command line options and arguments to generally support other features and functionality of the MAPS engine as described herein.

The line 1002 includes "./start_maps.py", identifying a Python programming language file invoked to start the MAPS session or run. In this example, at least portions of the MAPS engine may be written in Python as well as any other suitable programming language.

The line 1004 includes "-cyc_path/home/cyc/dev/repos/cyclone/source/cyc_core", identifying a directory or path including utilities and software installed on the data storage system or appliance upon which the tests will execute.

The line 1006 includes "-sys WX-D6024", identifying "WX-D6024" as the appliance or data storage system(s) upon which the tests will be executed.

The line 1008 includes "-metrics pg_stat cpu memory java_profile java_gc", identifying the data collectors to be activated for data collection in this MAPS session and test run. In particular, the line 1008 indicates that the following 5 data collectors are activated to perform data collection for this MAPS command:

1. pg_stat data collector. This collector collects information regarding the PostgreSQL DB used as the data storage system configuration DB.
2. cpu collector. This collector collects CPU resource consumption or usage information.
3. memory collector. This collector collects memory resource consumption or usage information.
4. java_profile collector. This collector collects runtime profile information on the JVM. The profile information may relate to resource consumption or usage of CPU, memory, and/or cache. Such profile information may be provided overall regarding resource consumption and may be further broken down by process. The particular information collected by the java_profile may vary depending on other arguments included in the command line and what the default is.
5. java_gc. This collector collects data regarding Java garbage collection. Such information may include, for example, the average amount of memory freed per minute or other unit of time, the maximum amount of heap storage allocated at various points in time, and the like.

The lines 1010, 1012 and 1014 identify collector arguments for the memory collector. In at least one embodiment, all collector arguments for a particular collector may start with a particular prefix and underscore associated with the particular collector. For example, the arguments for the memory collector are denoted by the argument prefix "mem_". The line 1010 includes "-mem_container", indicating that the memory collector is to gather container level memory metrics. In at least one embodiment, a data container may be a logical grouping of storage entities, such as a group of LUNs or virtual volumes used by VMs. Resource consumption such as memory consumption may be tracked by the memory collector per data container. The line 1012 includes "-mem_jvm" telling the memory collector to gather JVM Memory metrics. The line 1014 includes "-mem_processes all" telling the memory collector to gather process level memory metrics for all known processes.

The lines 1016, 1018, 1020 and 1022 identify collector arguments for the cpu collector. In this example, the arguments for the cpu collector are denoted by the argument prefix "cpu_". The line 1016 includes "-cpu_component CP" indicating that the cpu collector is to collect data related to cpu usage for the control path but not the data path. The line 1018 includes "-cpu_processes all" indicating that the cpu collector is to gather process level CPU metrics for all processes of the control path. The line 1020 includes "-cpu_utilization 0.01" indicating that the cpu collector should only show cpu utilization data that is greater than the utilization threshold of 0.01 or 1 percent utilization. The line 1022 includes "-cpu_per_cpu_graphs" indicating that the cpu collector is to generate individual graphs regarding CPU utilization per CPU processor in the generated report.

The line 1024 includes "-tests volumes -vol_count 500" and identifies the test to be run and input arguments to the test. In particular, the line 1024 identifies the volumes test to be performed with the argument of vol_count=500. As discussed elsewhere herein, the volumes test may execute management commands that first create a specified number of LUNs where each LUN is created with an individual create LUN command. Subsequently, the volumes test deletes the specified LUNs just created by the volumes test, where each LUN is deleted using an individual delete LUN command.

Referring to FIG. 4B, shown is an example 1050 of the MAPS session or run using the MAPS command line from the example 1000 of FIG. 4A. The content of FIG. 4B may be included in a session log file or console log file, for example, when the command from FIG. 4A is executed via the CLI at the data storage system console.

In the example 1050, the line 1052 repeats the command from the FIG. 4A. The remaining lines 1054-1092 of FIG. 4B are subsequent lines of the console or session log file where, for illustrative purposes, the MAPS engine writes to the session or console log file as runtime processing progresses through the MAPS engine when executing the command 1052. Consistent with other discussion herein such as in connection with FIG. 3C, the lines 1054, 1056, 1058 and 1060 indicate that the collector controller 412 is invoked to perform any needed setup processing for the data collectors indicated on the command line 1052. The lines 1062 and 1064 indicate that the collector controller 412 is invoked to perform any needed start processing to commence data collection by the data collectors indicated on the command line 1052. The lines 1066 and 1068 indicate, respectively, that the volumes test was started and completed successfully. The line 1070 outputs the total elapsed run time for the volume test. The lines 1072 and 1074 indicate that the collector controller 412 is invoked to perform any needed stop processing when stopping data collection by the collectors indicated on the command line 1052. The lines 1076 and 1078 indicate that the collector controller 412 is invoked to perform any needed gather processing to gather or aggregate the data collected by the collectors indicated on the command line 1052. The line 1080 indicates that the collector controller 412 is invoked to perform any needed post processing for the collectors indicated on the command line 1052. The line 1082 indicates that the collector controller 412 is invoked to perform any needed cleanup for the collectors indicated on the command line 1052. The line 1084 indicates that the test runner 414 is invoked to send its report data included in the report sections to the report generator 418. The line 1086 indicates that the collector controller 412 is invoked to send its report data included in the report sections to the report generator 418. The line 1088 indicates that the report generator 418 generated the report.

The line 1090 indicates the report file name. The line 1092 indicates the directory including the generated report file.

In connection with the MAPS command 1052, there is no option specified for data archiving or performing run analysis. In this example, the default may be that no data archiving by the data archiver 422 is performed and no run analysis is performed by the run analyzer 420. Thus, the console or session log of FIG. 4B does not include trace information indicating that the foregoing components were invoked by the MAPS command 1052.

Figure 4C:
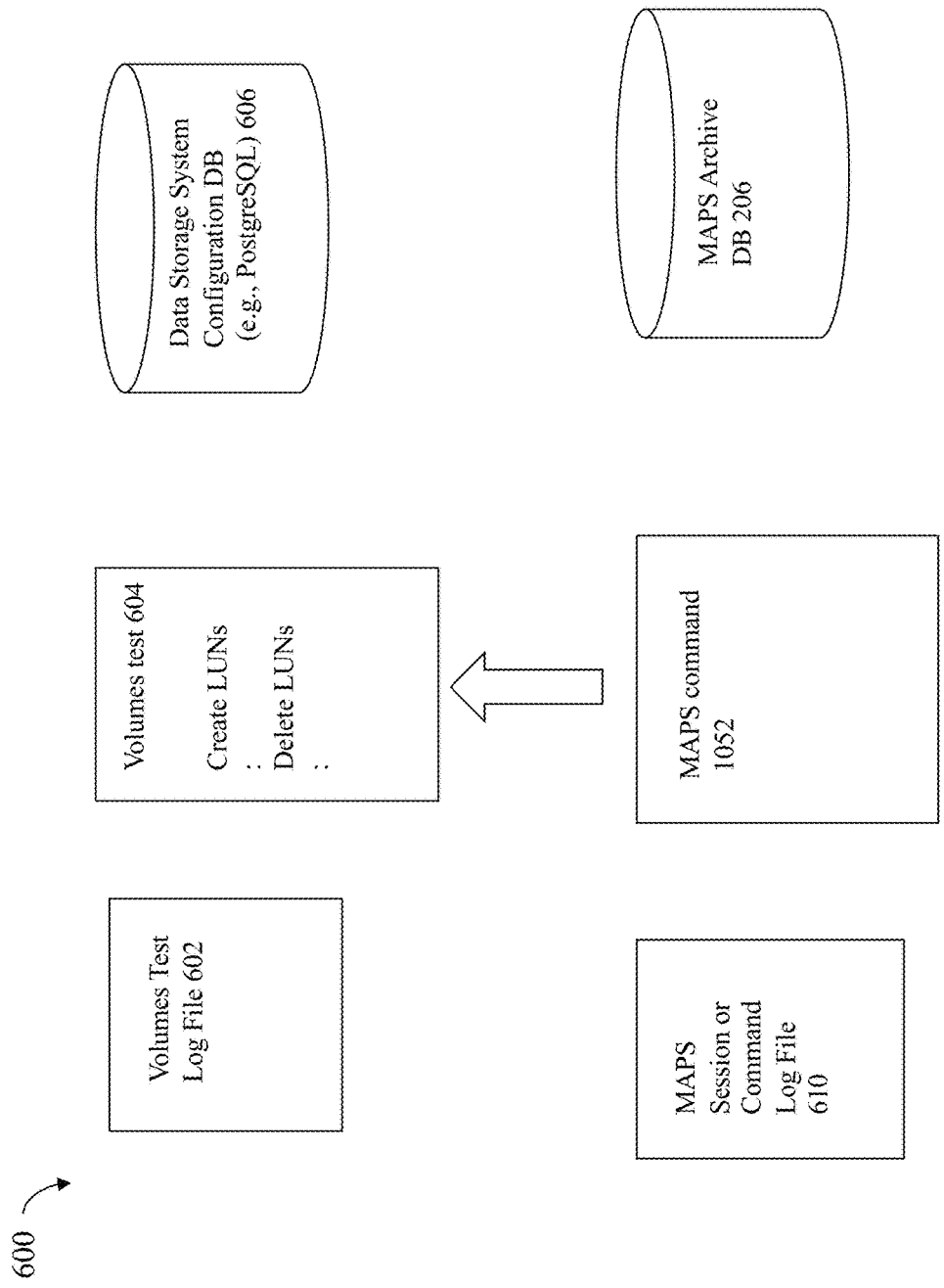
FIG. 4C is an example illustrating log files and databases used when executing a test specified in a MAPS command in an embodiment in accordance with the techniques herein.

Referring to FIG. 4C, shown is representation 600 of the log files and databases used in connection with executing the MAPS command line 1052 in an embodiment in accordance with the techniques herein.

The example 600 includes the MAPS command 1052 that is executed and for which the MAPS session or command log file 610 is created. For the command 1052, the MAPS session or command log file 610 may include the information as illustrated in the FIG. 4B. As noted above, the particular command 1052 did not specify to archive information regarding the MAPS session and data collected when executing the command 1052. However, if the data archiving flag is specified on the command line, the data collected is stored in the MAPS archive DB 206.

Execution of the MAPS command 1052 launches execution of the volumes test 604. In at least one embodiment, a separate test log file may be created for each test executed by the test runner 414. Thus, in this example, the log file 602 may be created for the volumes test. The log file 602 is a log of processing performed when executing the volumes test 604. For example, the log file 602 includes log records of commands of the volumes test executed for each LUN created and each LUN deleted. As volumes or LUNS are created and deleted, data storage system configuration information stored in the data storage system configuration DB is accordingly updated. In at least one embodiment, the data storage system configuration DB 606 may be a PostgreSQL DB as described elsewhere herein. If the MAPS command 1052 identifies one or more additional tests to be executed (e.g., where such additional tests may be specified using the -tests flag of the MAPS command), a separate test log file similar to 602 may be created for each such additional test.

Referring to FIG. 4D, shown is an example 650 of a test log file for the volumes test in an embodiment in accordance with the techniques herein. The example 650 provides further detail regarding information that may be included in the volumes test log file 602 of the FIG. 4C. The element 652 denotes the test command executed for the volumes test to create 500 LUNs and then delete the same 500 LUNs, where each LUN creation and deletion is performed by executing an individual management command (e.g., as opposed to a "bulk" management command which may request creation of all 500 LUNs with a single command and request deletion of all 500 LUNs with a single command). Execution of the test command 652 may be initiated by the test runner of the MAPS engine in an embodiment in accordance with the techniques herein. The lines 654 of the log file correspond to entries related to creating the 500 LUNs. The lines 656 of the log file correspond to entries related to deleting the 500 LUNs.

Figure 5B:
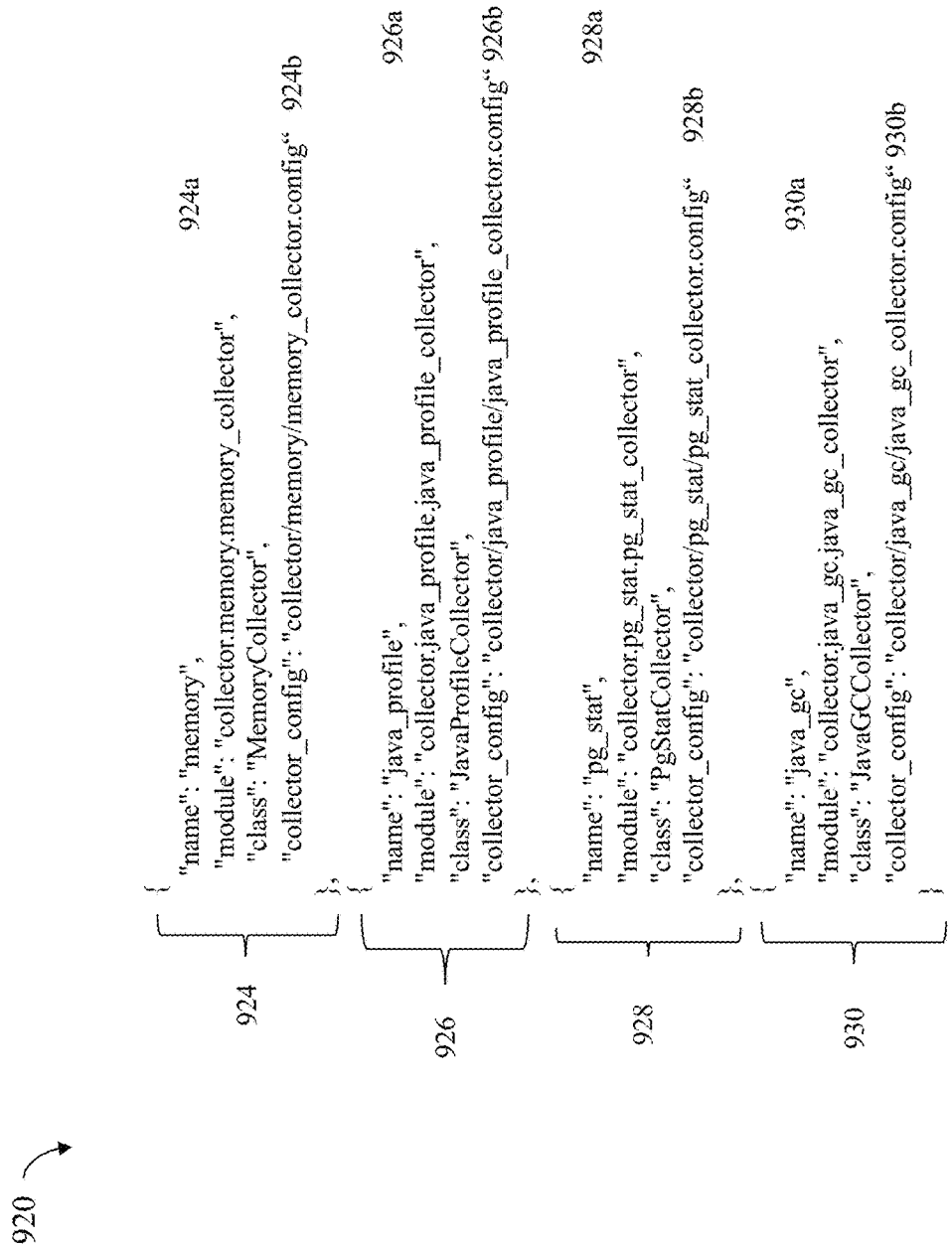

Referring to FIGS. 5A, 5B and 5C, shown is an example of information that may be included in a top level MAPS configuration or config file for use when running the MAPS command of FIG. 4A in an embodiment in accordance with the techniques herein. Generally, the MAPS config file provides the top or high level definitions exposed to an external user of the MAPS engine. Additionally, the MAPS config file may also reference other configuration files including definitions for tests and collectors used with the MAPS engine. Thus, the MAPS configuration file, along with other configuration files as described herein, may be an input to the MAPS engine for use when processing or servicing a MAPS command. Collectively, FIGS. 5A, 5B and 5C may be characterized as snippets or portions of information that may be included in the MAPS configuration file in an embodiment in accordance with the techniques herein. The MAPS configuration file may include additional information than as provided in FIGS. 5A, 5B and 5C for simplicity of illustration.

Referring to FIG. 5A, shown is a first portion of information that may be included in a MAPS configuration file in an embodiment in accordance with the techniques herein. The line 902 indicates this is a main configuration file for the MAPS engine. The element 904 specifies two different environment or setup options. The element 906 specifies a first named environment or setup option, "setup_v1" 906*a*, having a corresponding definition included in the configuration file "setup environment/setup_v1.config" 906*b*. The element 908 specifies a second named environment or setup option, "setup_v2" 908*a*, having a corresponding definition included in the configuration file "setup environment/setup_v2.config" 908*b*. The configuration files identified by 906*b*, 908*b* correspond to the environment or setup definitions 423 of FIG. 3C. In the particular embodiment described in connection with the example 900, the environment initializer 410 of FIG. 3C may use one of the two setup configuration files 906*b* and 908*b* as suitable for the particular appliance the MAPS engine is executing on. In at least one embodiment, the environment initializer's definition class may include a method that returns information regarding what one or more environment setup versions are supported. In connection with the example 900, the method may return information indicating that the particular versions v1 (denoting the setup_v1 associated with the elements 906*a*, 906*b*) and v2 (denoting the setup_v1 associated with the elements 908*a*, 908*b*) are supported. When the MAPS engine is executing, the environment initializer 410 will check the appliance is being initialized for use by the MAPS engine and select one of the supported setup versions that matches the appliance. For example, the element 906 may correspond to v1 and denote setup information for a first type of data storage system appliance, and the element 908 may correspond to v2 and denote setup information for a second type of data storage system appliance. The environment initializer 410 may perform processing that selects the appropriate version, v1 or v2, based on the type of appliance the MAPS engine is executing upon. If, for example, the MAPS engine executes on an appliance of the first type, the environment initializer 410 selects v1 and uses the setup_v1 configuration file 906*b*. If, for example, the MAPS engine executes on an appliance of the second type, the environment initializer 410 selects v2 and uses the setup_v1 configuration file 908*b*. Generally, an embodiment may have any suitable number of supported environment setups and is not limited to 2 as illustrated by the element 904.

In at least one embodiment, the MAPS command line may provide support for a setup customization option, such as "-custom_setup CUSTOM_SETUP", where CUSTOM_SETUP may be the configuration file representing the setup command to run. Generally, the custom_setup option provides ability for a user to perform additional setup steps to the setup prior to the test running. For example, a user may have their own additional setup in another configuration file, such as one named "custom_setup.config". To further illustrate, the user may add their own customized setup by creating the setup configuration file, such as the one named "custom_setup.config" to include the following:

```
{
    "name": "custom_setup",
    "command_dir": /mycustom_setupdir/",
    "command": "COMMAND EXECUTED"
}
``` where
"name" is a name of this particular setup;
"command" is the command to be executed; and
"command_dir" is the directory where the setup "command" is executed from.
On the MAPS command line, the user may then specify "-custom_setup custom_setup.config" to execute the customized setup command.

The element 910 denotes a portion of collector definitions and identifies or references the collector specific configuration files including the details of the collector definitions 424. The element 912 provides the definition for the system configuration collector described elsewhere herein. The name of the collector is "sys config 912a. As denoted by 912b, the system configuration collector is available for internal use only by the MAPS engine. The element 914 provides the definition for the cpu collector described elsewhere herein. The name of the collector denoted by 914 may be referenced in the MAPS command line as "cpu" denoted in the line 914a. As denoted by reference 914b, the file "collector/cpu/cpu_collector.config" includes the detailed definition of the cpu_collector.

Referring to FIG. 5B, shown is another portion 920 of collector definitions that may be included in the MAPS configuration file. The element 924 provides the definition for the memory collector described elsewhere herein. The name of the collector denoted by 924 may be referenced in the MAPS command line as "memory" denoted in the line 924a. As denoted by the reference 924b, the file "collector/memory/memory_collector.config" includes the detailed definition of the memory collector.

The element 926 provides the definition for the Java profile collector described elsewhere herein. The name of the collector denoted by 926 may be referenced in the MAPS command line as "java_profile" denoted in the line 926a. As denoted by the reference 926b, the file "collector/java_profile/java_profile_collector.config" includes the detailed definition of the java_profile collector.

The element 928 provides the definition for the pg_stat collector described elsewhere herein. The name of the collector denoted by 928 may be referenced in the MAPS command line as "pg_stat" denoted in the line 928a. As denoted by the reference 928b, the file "collector/pg_stat/pg_stat_collector.config" includes the detailed definition of the pg_stat collector.

The element 930 provides the definition for the java_gc collector described elsewhere herein. The name of the collector denoted by 930 may be referenced in the MAPS command line as "java_gc" denoted in the line 930a. As denoted by the reference 930b, the file "collector/java_gc/java_gc_collector.config" includes the detailed definition of the java_gc collector.

Other defined collectors, including a user added collector, may include a high level definition in the MAPS configuration file similar to the element 914 of FIG. 5A and the elements 924, 926, 928 and 930 of FIG. 5B. Additionally, each such collector may have a corresponding configuration file that includes the detailed definition of the collector, where the collector's configuration file is referenced in the high level definition of the MAPS configuration file. Detailed examples of configuration files including collector definitions are described elsewhere herein.

Generally, an embodiment may allow a user to define their own new collector in a manner similar to the existing collectors of the MAPS engine as described herein. In at least one embodiment, adding a new collector may generally include creating a new collector class and adding the new collector definition to the MAPS configuration file. For example, a user may define a new collector called "mycollector" by defining a new class called "MyCollector" and including the following in the collector definitions section of the MAPS configuration file:

```
{
    "name": "mycollector",
    "module": "collector.mycollector.my_collector",
    "class": "MYCOLLECTOR"
},
``` where the "name" is the name used with the -metrics flag described herein with the MAPS command to initiate the new collector. Assuming the new collector also has the configuration file, "MYCOLLECTOR.config", the following additional line may be added to the above: "collector_config: MYCOLLECTOR.config.

As discussed elsewhere herein, the new collector configuration file may include database table definitions that may be automatically included in the MAPS archive DB such as to archive data collected by the new collector. The new collector class may implement a particular method, such as the get_db_data method, that is invoked at runtime by the Data Archiver of the MAPS engine to return the list of data items or objects to be archived. The data items or objects in the list may have a definition matching one of the DB table definitions of the collector configuration file. In at least one embodiment, the Data Archiver expects the collector's class to implement or define the get_db_data method as well as the get_db_table definitions method. The get_db_table definitions method may be invoked to return a list of DB table definitions for the collector. In such an embodiment, the MAPS engine may automatically implement or define the get_db_table definitions method for any collector that defines its DB table definitions in the collector's configuration file.

As described herein, an embodiment of the MAPS engine may use different routine or method callbacks that, if defined or implemented for the collector class, may be invoked for the collector class at different defined points in time by the MAPS engine. In at least one embodiment, the MAPS engine may specify one or more callback interface templates or signatures, such as for routines or methods, and may indicate the purpose of such interfaces. A user may implement such routines or methods using a suitable programming language. At runtime, the MAPS engine then calls back into the user provided code by invoking the callback routines or methods to perform particular processing and/or return values used by the MAPS engine at different points in time. In this manner, the callback routines or methods may be characterized as runtime hooks for any suitable purpose. Depending on the embodiment, implementing some callbacks may be required and others may be optional. Some optional callbacks may also provide the user with the option of performing any customized user-specified processing at different points.

In at least one embodiment, callback methods optionally implemented for the new class MYCOLLECTOR may include the following: setup, start, stop, gather, postprocessing, and cleanup. Additional callback methods may also be optionally defined or implemented for a collector class depending on the particular types of supported user defined collectors. For example, a user defined collector may be a continuous collector that is started at the beginning of a test and then stopped after the test has completed. In this case, the start method may include code that starts processing for the data collector and the stop method may include code that stops data collection by the data collector. Thus, different ones of the foregoing methods may be implemented for the collector class data collection as needed. An embodiment may also implement additional methods or callbacks for the new collector class where such additional methods are automatically invoked by the MAPS engine at predetermined times. For example, the MAPS engine may include support for a periodic collector by calling the poll method if the poll method is defined or implemented for a collector class. The poll method may be implemented for the new collector class where poll is called by the MAPS engine on a specified periodic interval to collect data. As another example, the MAPS engine may invoke the method handle restart( ) if defined or implemented for the collector class to handle any needed processing to restart the collector or associated processes responsive to the system or node restarting.

In the simple case, a new collector being added may not have any MAPS command line arguments. Alternatively, a new collector added may have arguments exposed to the user of the MAPS engine such as for use on the MAPS command line. In at least one embodiment, one or more new collector arguments may be exposed for use in a MAPS command by implementing the add_command_arguments( ) static method in the new collector class, MYCOLLECTOR, with a particular signature such as illustrated below:

```
@staticmethod
def add_command_arguments(collector_args_group, configs):
    collector_args_group.add_argument (MYCOLLECTOR.ARG1,
        required=False, Default=None,
        help='A positive integer value denoting a minimum threshold' )
```

Generally, the above signature exposes a single argument ARG1 for the new collector class MYCOLLECTOR having the collector name "mycollector". However, additional collector arguments may be similarly added to the static method. The foregoing collector may be activated for data collection by referencing "-metrics mycollector" on the MAPS command line. A definition for the collector may be made in the MAPS configuration file (e.g., as in the collector definitions of FIGS. 5A and 5B) identifying the collector name "mycollector" and associating the foregoing collector with the class MYCOLLECTOR. During execution of a MAPS command, the MAPS engine will invoke the method add_command_arguments if defined for the new collector class. The method add_command_arguments returns a list of arguments that can be specified on the command line for the data collector. It should be noted that in the above signature, "required" may be set to true if the associated argument is required, and otherwise "required" may be set to false as above when the associated argument is not required to be specified on the command line. In the above signature, "Default" is set to none indicating that no default value is provided for the argument if omitted from the command line. Generally, "Default" may be set to any suitable default value for the associated argument. In the above signature, "help" indicates information displayed for online help for the particular argument. In this manner, "help" may be set to a different value than as noted above and may vary with the particular command and argument.

For a new collector added as described herein, the new collector may be referenced in a MAPS command such as in connection with the -metric flag as illustrated in the command 1052 of FIG. 4B. When executing the MAPS command referencing the new collector, all implemented or defined methods of the new collector's associated class are invoked by the MAPS engine.

Referring to FIG. 5C, shown is a third portion of information that may be included in the MAPS configuration file in an embodiment in accordance with the techniques herein. The element 944 describes information about defined tests that may be invoked by the test runner. The test runner of the MAPS engine exposes tests to a user (where such exposed tests may be specified on the MAPS command line) based on test definitions found in the MAPS configuration file as illustrated by the element 944. In the element 944, there are the three test definitions custom 946, manual 948 and volumes 950. These test definitions also represent the three types of tests supported in one embodiment. Custom and manual are two special test types described elsewhere herein. The custom test definition or type 946 allows a user to define a test using their own script. The manual test definition or type 948 allows a user to interactively and manually execute tests. The third test definition of volumes 950 is an example of an integrated test definition. There may be a test definition similar to 950 for each integrated test of the MAPS engine. The integrated test definition 950 for the volumes test includes a name 950*a* and a test config file 950*b* specifying a test configuration file including the detailed test definition. The name 950*a* denotes the test name that may be specified on the MAPS command line with the -tests flag (e.g., as in connection with the MAPS command of FIG. 4A). An example of a test configuration file for the volumes test is described elsewhere herein.

The test result mappers 952 define the different data mappers that may be used in connection with mapping client log file data to corresponding report data items included in the generated report. An example of a client or user log file is the test log file 602. Although the mappers 952 may be illustrated in connection with mapping data from client or user logs, more generally, the mappers 952 may be used in connection with mapping data from any source to corresponding report data items.

The element 954 defines the "ClientLogToReportTextMapper" that maps data from a client or user log to text report data included in the generated report. For example, the client or user log refers to a log file created during test execution. The user or client refer to a user or client of the MAPS engine that issues a MAPS engine command. One type of log file is the test log file, such as the volumes test log file 602. More generally, multiple types of client log files may be used in connection with the mapper denoted by the element 954. For example, in at least one embodiment, execution of a test may result in multiple types of user or client logs.

The element 956 defines the "ClientLogToReportScalerMapper" that maps data from a client or user log (e.g., such as a test log) to a scalar or numeric report data value included in the generated report.

The element 958 defines the "MarkersDurationToReportScalarMapper" that maps a duration denoting an amount of time between two markers to a scalar or numeric report data value included in the generated report. The two markers may come from any source from which the marker collector collects marker data. For example, markers may be defined and collected by the marker collector from various sources such as test logs, server logs (e.g., log files for the appliance or data storage system such as event logs, state machine logs that log the different states transitioned into when processing or servicing management commands), other client logs, and the like. The mappers 954, 956 and 958 are described in more detail elsewhere herein.

Referring to FIGS. 6A and 6B, shown in more detail is information that may be included in a test configuration file. In particular, the FIGS. 6A and 6B include content for a single test configuration file for a volume test that issues management commands to create one or more LUNs and then to delete the same one or more LUNs just created. The test configuration file is partitioned into the two FIGS. 6A and 6B. Other integrated tests may include a test configuration file similar to that as described in connection with FIGS. 6A and 6B for the volumes test.

Referring to FIG. 6A, shown is an example 300 of a first portion of the test configuration file for the volumes test in an embodiment in accordance with the techniques herein. The example 300 includes the line 302 denoting the name of the test. Additionally, the name of 302 is used to name the log file that contains the output generated from executing the test command at line 306. The line 304 identifies the path of where the test command should be executed from. The line 306 identifies the command to execute.

The element 308 identifies a single test argument, "vol_count" exposed to the user. The line 308a identifies the argument or parameter name "vol_count" that may be included on the command line when the user invokes the test. The vol_count argument value identifies the number of LUNs or volumes to be created and then deleted in the volumes test. The line 308b identifies the test name "volumes" should be referenced in the command line to invoke this particular test with the particular argument "vol_count". The line 308c indicates that the argument type for vol_count is integer. The line 308e indicates that the argument vol_count is not required but optional. If the argument vol_count is not provided a value in the command line, vol_count is assigned a default value of 2000 as denoted by the line 308d. The line 308f denotes the information included in the help file information for this test and argument.

In at least one embodiment, a test configuration file may include at a minimum the information as denoted in the lines 302, 304 and 306. The remaining portions of the test configuration file as illustrated in FIGS. 6A and 6B may be optional.

The element 320 identifies an array of marker definitions. Generally, marker definitions may be used to identify certain events in a test so that they may be referenced, for example, in graph output such as a label on the graph for a corresponding point in time or used in reporting test results. Markers are defined by the name specified for the marker, the type which tells the MAPS engine where (e.g., in what file or log) to look for the marker, and a regular expression that will match the log entry correlating to the marker. Optionally, for a marker definition, the Boolean is_graphed may be specified to indicate that the marker should not appear in the graph. In at least one embodiment, a marker definition may include the name and a type. Any remaining portions of the marker definition may vary depending on the marker type. In at least one embodiment, supported marker types may include "client" denoting a client log and "server" denoting a server log of the data storage system or appliance.

In this example 320, there are 2 marker definitions 322 and 324. The marker 322 is a marker definition having the name "Create Volumes Start" as denoted by the name 322a. The line 322b indicates that the marker is located in the client test log for this test, the volumes test. The line 322c indicates that the marker is located in a line of the log file, where the line includes "cc* creating". The date/timestamp of the matching line is assigned to the marker "Create Volumes Start". For example, the volumes test log file may include a line 100** as follows:

2020-08-20 18:12:26,177 *creating 500 volumes *
The above line 100 matches the regular expression 322c and the marker definition "Create Volumes Start" is then assigned the date/timestamp "2020-08-20 18:12:26"

The marker 324 is a marker definition having the name "Delete Volumes Start" as denoted by the name 324a. The line 324b indicates that the marker is located in the client test log for this test, the volumes test. The line 324c indicates that marker is located in a line of the log file, where the line includes "*** deleting". The date/timestamp of the matching line is assigned to the marker "Delete Volumes Start".

Before describing the example of the report section definitions of FIG. 6B, the following paragraphs provide an initial discussion of the report section, report data objects and the generated MAPS report for the test.

Generally, a MAPS report for the volumes test is generated based on report sections and report data objects. The report section object contains a title or name and a list of one or more report data objects. In at least one embodiment, each report data object may be one of the following 5 supported report data object types:

Report Text Data representing text data assigned to the report data object;

Report Scalar Data representing a value assigned to the report data object (e.g., name-value pair where name is the report data object and the value is a numeric value assigned to the name);

Report Tabular Data where a table of data is assigned to the report data object;

Report Image Data where an image is assigned to the report data object;

Report Section representing a report sub section that can include its own child report data objects.

An embodiment in accordance with the techniques herein may use test result report data mappers (also sometimes referred to as test result mappers or mappers) which are used to map data from a source, such as a test client log file, to a corresponding report data object included in the MAPS report. In at least one embodiment, the mappers may include the following:

"ClientLogToReportTextMapper" that extracts text from the test's log file and generates a Report Text Data object representing the extracted text;

"ClientLogToReportScalarMapper" that extracts text from the test's log file and generates a Report Scalar Data object using the extracted text as the value of the scalar;

"MarkersDurationToReportScalarMapper" that locates one or more matching pairs of start and end markers from the marker data collected by the marker collector, and generates a Report Scalar Data object that includes the duration or difference between the time stamps of each start/end pair. As an example, the "MarkersDurationToReportScalarMapper" may be used to define a pair of start and end markers from a test's log file and generate a difference or duration between the time stamps of the start and markers.

Referring to FIG. 6B, shown is an example 350 of a second portion of the test configuration file for the volumes test in an embodiment in accordance with the techniques herein. The example 350 includes a report section definitions section that may be included in a test configuration file.

With reference to the example 350, the line 351 denotes the title or name of the report section and the element 352 denotes the list or array of report data objects. In this example 350, the MAPS report generated includes a report section named "Volume Test Summary" (351) with an associated report subsection (as the report data object) named "Volume Test Results" (354). The report subsection named "Volume Test Results" (354) further includes the following 6 report data objects: 360, 362, 364, 366, 368 370.

The line 356 indicates the type of each of the report data objects 360, 362, 364, 366, 368 370, where the type 356 is "ClientLogToReportScalarMapper" noted above. In the element 360, the Report Scalar Data object has the name "Mean Volume Create Time (sec)" 360a that is assigned the value matching the regular expression denoted by match at line 360b. The regular expression 360b includes a first part, "(?<=Mean Volume Create Time:\\s)" and a second part, "(\\d*\\.?\\d*)". The second part indicates the matching expression for a real decimal number to be extracted from the test log and assigned as a scalar value to the report object with the name 360a. It should be noted that the remaining matches 362b, 364b, 366b, 368b and 370b similarly contain two parts with the second part denoting the real decimal number extracted from the log file. To further illustrate, the test log file may include the following line:

Mean Volume Create Time: 172.115 seconds

The match 360b denotes a regular expression matching the above line, where the extracted data is 172.115 that is assigned as a scalar to the report data object 360a.

In the element 362, the Report Scalar Data object has the name "Volume Create Throughput (req/sec)" 362a that is assigned the value matching the regular expression denoted by "match" at line 362b. In the element 364, the Report Scalar Data object has the name "Test Volume Create Time (sec)" 364a that is assigned the value matching the regular expression denoted by "match" at line 364b. In the element 366, the Report Scalar Data object has the name "Mean Volume Delete Time (sec)" 366a that is assigned the value matching the regular expression denoted by "match" at line 366b. In the element 368, the Report Scalar Data object has the name "Volume Delete Throughput (req/sec)" 368a that is assigned the value matching the regular expression denoted by "match" at line 368b. In the element 370, the Report Scalar Data object has the name "Total Volume Delete Time (sec)" 370a that is assigned the value matching the regular expression denoted by "match" at line 370b.

Generally, the pattern denoted by "match" statements such as in FIGS. 6A an 6B may be characterized as matching criteria used in locating a matching item such as in the test log file.

What will now be provided is an example illustrating the "MarkersDurationToReportScalarMapper" which, as noted above, locates one or more pairs of start and end markers, and generates a Report Scalar Data object that includes the duration or difference between the time stamps of each start/end pair. To illustrate use of this mapper, the following report_data_definitions section may be included in the test's configuration file and where the markers in this example are collected from the test log file for the volumes test. In at least one embodiment, the marker data collected by the marker collector may be included in a marker data file. For example for the volumes test, the marker data collected for defined markers included in the volumes test configuration file may be stored in a marker file, such as a CSV file, including the marker name, associated time stamp within the volumes test log file, and possibly other associated properties such as a value for the Boolean is_graphed described elsewhere herein. The following is the report_data_definitions section that may be included in the volumes test configuration file:

```
:
"report_data_definitions": [
    {
        "name": "Volumes Results Summary",           A0
        "type": "MarkersDurationToReportScalarMapper"
        "config": [
            {
                "name": "Create Volume Duration",    Line A1
                "start_match": "Create Volumes Start", Line A2
                "end_match": "Delete Volumes Start"   Line A3
            }
        ]
    }
]
``` where:
name on the line A0 is the name of the Report Scalar data object that is generated;
type is "MarkersDurationToReportScalarMapper" denoting the mapper to use; and
config is an array of names and start_match/end_match pairs where the match values are regular expressions denoting the defined marker names to match in the collected marker data file for the volumes test. Subsequently, a duration or difference is then determined for each pair and assigned to an associated name.

For example, assume the marker data collector collected the following data in a marker data file for the volumes test. The marker data file includes the following defined marker names and time stamps based on the marker definitions 322 and 324 of FIG. 6A for the volumes test configuration file:

| Time stamp | Marker Name | |
|---|---|---|
| 2020-08-20 18:12:23 | Create Volumes Start | Entry 1 |
| 2020-08-20 23:12:12 | Delete Volumes Start | Entry 2 |

In this case, the marker name "Create Volumes Start" from Line A2 matches the Marker Name value in the first entry 1 of the above marker data file portion for the volumes test, and the Line A3 matches the Marker Name value in the second entry 2 of the above marker data file portion for the volumes test. The time stamps of both entry 1 and entry 2 of the marker data file for the volumes test are extracted. Subsequently, the duration or difference between these two time stamps (e.g., the time stamp 2020-08-20 23:12:12 from entry 2 and the time stamp 2020-08-20 18:12:23 from entry 1) is determined and assigned to the Report Scalar Data object named "Create Volume Duration" in the line A1. As discussed elsewhere herein, the report generated by the report generator 418 includes the data described by the Report Sections and Report Data objects. In the above example, the Report Scalar Data object will be included in the generated report.

What will now be provided is an example illustrating the "ClientLogToReportTextMapper" which, as noted above, extracts text from a client log file and generates a Report Text Data object representing the extracted text. To illustrate use of this mapper, the following report_data_definitions section may be included in the volumes test configuration file to extract data from the volumes test log file and map the extracted data to a Report Text Data object:

```
"report_data_definitions": [
   {
      "name": "Test Results Summary",       Line A4
      "type": "ClientLogToReportTextMapper",  Line A5
      "config": [
         {
            "name": "Volume Test Results",          Line A6
            "match": "(?ms)Mean Volume Create Time.*?(?=Total Volume Delete Time).*"  Line A7
         }
      ]
   }
]
``` where name in the Line A4 is the name of a Report Text Data object generated;

type in the line A5 is "ClientLogToReportTextMapper" indicating to use this mapper; and config is an array of names and matches where the match value is a regular expression of what is extracted from the test log file and assigned to an associated name. In the above, the text of the test log file matching the expression of line A7 is assigned to the Report Text Data object having the name "Volume Test Results" indicated by the line A6. For example, assume the log includes the following in several consecutive lines of the test log file:

Mean Volume Create Time 172.11 sec
Volume Create Throughput 1.527 req/sec
:
Total Volume Delete Time 286.6 sec In this case, the Report Text Data object named "Volume Test Results" indicated by the line A6 is assigned the entire text spanning the above several consecutive lines of the test log file. As discussed elsewhere herein, the report generated by the report generator 418 includes the data described by the Report Sections and Report Data objects. In the above example, the Report Text Data object "Volume Test Results" will be included in the generated report.

In at least one embodiment, a collector may provide Report Section and Report Data objects that are included in the report by implementing or defining a method callback that the MAPS engine invokes, if defined for the collector's class, to obtain the collector's data for the generated report. For example, the callback method get_report_sections may be implemented for a particular collector, where the collector's get_report_sections method returns the collector's Report Section objects and Report Data objects to be included in the generated report. Thus in at least one embodiment, a collector definition file may include Report Sections (e.g., report_section_definitions) and Report Data objects (e.g., report_data_definitions) in a manner similar to those described herein such as, for example, in connection with the volumes test configuration file of FIG. 6B.

In at least one embodiment, the data archiver 422 may support archiving data in the MAPS archive DB 206 in a manner similar to how report data may be generated and used in report generation as described herein. In at least one embodiment, data archiving capability may be added to a collector by adding one or more DB table definitions to the collector configuration file, where the one or more DB table definitions are for the MAPS archive DB 206; and by additionally implementing or defining the get_db_data method for the collector's class. As described elsewhere herein, the get_db_data method may return one or more DB objects that are to be archived in the MAPS archive DB 206. As part of executing a MAPS command referencing a particular collector to collect data, the MAPS engine invokes the get_db_data method for that particular collector to gather data (as collected by the particular collector) where the gathered data is archived in the MAPS archive DB 206.

Figure 7:
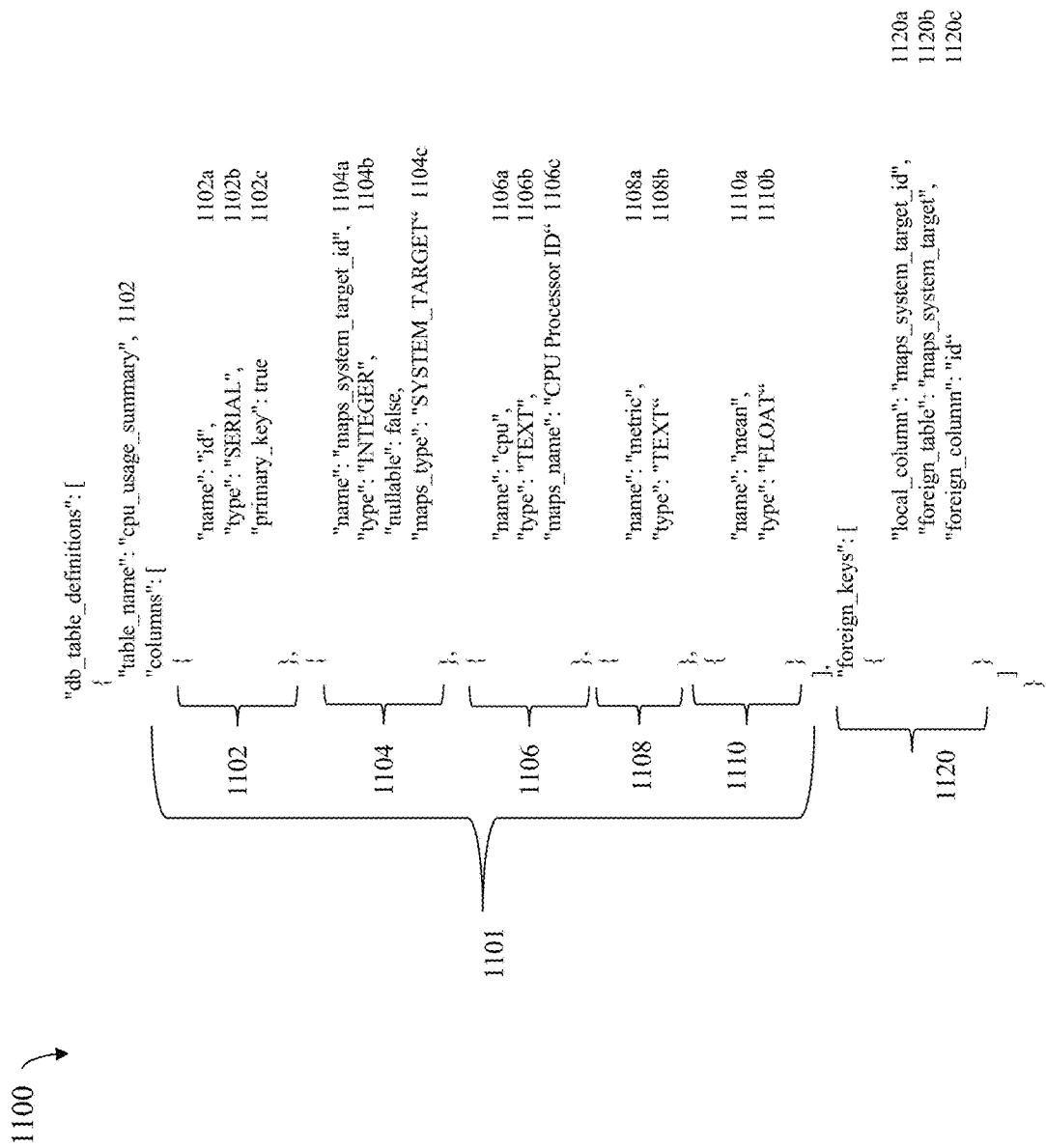
FIG. 7 is an example of content that may be included in a collector configuration file in an embodiment in accordance with the techniques herein.

Referring to FIG. 7, shown is an example of a collector configuration file that may be used in an embodiment in accordance with the techniques herein. The example 1100 provides more detail regarding information that may be included in the cpu collector configuration file "cpu_collector.config" as referenced by 914b in the MAPS configuration file of FIG. 5A. Generally, each collector configuration file referenced in the MAPS configuration file portions of FIGS. 5A and 5B may similarly include information particular to the different collectors.

The example 1100 is an example of DB table definitions that may be included in the cpu collector's configuration file, where the DB table definitions are those of the MAPS archive DB 206. In particular the MAPS engine will automatically create and update the DB tables of the MAPS archive DB 206 matching those of the DB table definitions included in the collector configuration file. Thus, the DB tables definitions 1100 in the cpu collector configuration file specify to the DB archiver 422 what tables of the MAPS archive DB 206 are created and updated with data collected by the cpu collector. In turn, the DB archiver 422 will automatically perform any needed DB table creation and updating for the DB table definitions in the cpu collector configuration file. It should be noted that the cpu collector data (used by the DB archiver 422 to populate the DB tables specified in the cpu collector's configuration file of FIG. 7) may be obtained using the get_db_data method callback that is implemented in the collector's class and is described elsewhere herein.

The example 1100 includes only one DB table definition for simplicity of illustration. In actual implementation, the cpu collector configuration file may include multiple such DB table definitions as well as possibly other information. The table definition 1100 includes a table name 1102 denoting the DB table name, columns 1101 denoting an array or list of column definitions for the table, and foreign keys 1120 denoting an array or list of foreign keys for this table. As known in the art, a primary key for a table may denote the particular column having the value used to index or organize the table. The primary key of each record in the table is unique and may therefore be used to uniquely distinguish between different records of the table. Also known in the art, a foreign key refers to the primary key of another DB table. Thus, a foreign key is a key of a first table the may be used to link the first table to a second table. The second table uses the first table's foreign key as its primary key. In one aspect, foreign keys act as a cross-reference between tables.

In at least one embodiment, column definitions, such as those illustrated by 1101, may include the following:

name denoting the name of the DB table column.

type denoting the SQL type for the column.

primary key that is a Boolean value used to identify the primary key of the table.

nullable indicating whether the column is nullable. The value for nullable defaults to true if not specified for a column.

maps_type identifying, if any, the particular predefined MAPS internal data type for this column. The maps_type field, if specified for a column, identifies one of a set of predefined MAPS internal data types. In at least one embodiment, the defined MAPS types may include: MAPS_RUN where the column is a database identifier for the particular run of the MAPS command being archived; SYSTEM_TARGET where the column is the MAPS system target database identifier for the particular data storage system or appliance upon which the MAPS command is executed; and TEST_RUN where the column is the database identifier for one of the tests specified on the MAPS command line for which data is being archived.

maps_name that is used if the MAPS internal data item name does not match that of the DB column name. In such a case, the maps_name field denotes the MAPS internal name that maps to the particular DB column name.

In at least one embodiment, foreign key definitions, such as those illustrated by 1120, may include:

local_column denoting the name of a particular column in this table.

foreign_table denoting the name of a second DB table foreign_column denoting a specific column in the foreign table, where the foreign table uses the foreign column or specific column as its primary key.

With reference to FIG. 7, the table cpu_usage summary 1102 includes 5 columns denoted by the column definitions 1102, 1104, 1106, 1108 and 1110. The table cpu_usage summary 1102 includes CPU utilization summary information for a CPU in a system or node identified by the column definition 1102. The column definition 1102 has the name "id" 1102*a* and an SQL type of "SERIAL". Additionally, the column "id" 1102 is identified by 1102*c* as the primary key for the DB table 1101.

The column definition 1104 has the name "maps_system_target_id" 1104*a* and an SQL type of "INTEGER". Additionally, the column "maps_system_target_id" is an internal MAPS type of "SYSTEM_TARGET" as denoted by 1104*c*. The column definition 1104 indicates that the DB column "maps_system_target_id" denotes the appliance identifier of a particular appliance. Thus the CPU summary information of the DB table "cpu usage summary" includes summary CPU utilization information for the particular appliance having the corresponding appliance identifier defined by the column definition 1104.

The column definition 1106 has the name "cpu" 1106*a* and an SQL type of "TEXT". Additionally, the DB column "cpu" maps to a different MAPS internal data item of "CPU_Processor_ID" 1106*c*. Thus the CPU summary information of the DB table "cpu_usage_summary" includes summary CPU utilization information for the particular CPU denoted by 1106 on the appliance having the corresponding appliance identifier defined by the column definition 1104.

The column definition 1108 has the name "metric" 1108*a* and an SQL type of "TEXT" 1108*b*. The column definition 1110 as the name "mean" 1110*a* and an SQL type of "FLOAT". The column definition 1108 may include the mean CPU utilization for the particular CPU denoted by 1106 on the appliance having the corresponding appliance identifier defined by the column definition 1104.

The foreign keys 1120 provides a definition for a single foreign key where the DB table local column (1120*a*) "maps_system_target_id" denotes the primary key "id" (1120*b*) in another DB table named "maps_system_target" (1120*c*). In other words, the column 1104 points to or references an entry or row in another database table named "maps_system_target".

What will now be described are examples of run analysis that may be performed by the run analyzer 420 in an embodiment in accordance with the techniques herein. Assume that the run analyzer is invoked in connection with the MAPS engine command 1052, either by default or by including an appropriate flag on the command line. For example, assume that if "-run" is additionally included in the command 1052, the MAPS engine will invoke the run analyzer 420 to generate analysis output based on analyzing the data collected by the various collectors during the volumes test run. The cpu collector and pg_stat collector may perform data collection while executing the volumes test run.

The volumes test may be run in a data storage appliance having 2 nodes such as illustrated in connection with FIG. 2. The CPU utilization information collected by the cpu collector may report on the CPU utilization per node. Each node may include 2 CPUs and the cpu collector may further provide the CPU utilization individually for each of the 2 CPUs of each node. Additionally for each CPU, the cpu collector may report on the total CPU utilization as well as CPU utilization for user tasks and for system tasks.

Figure 8A:
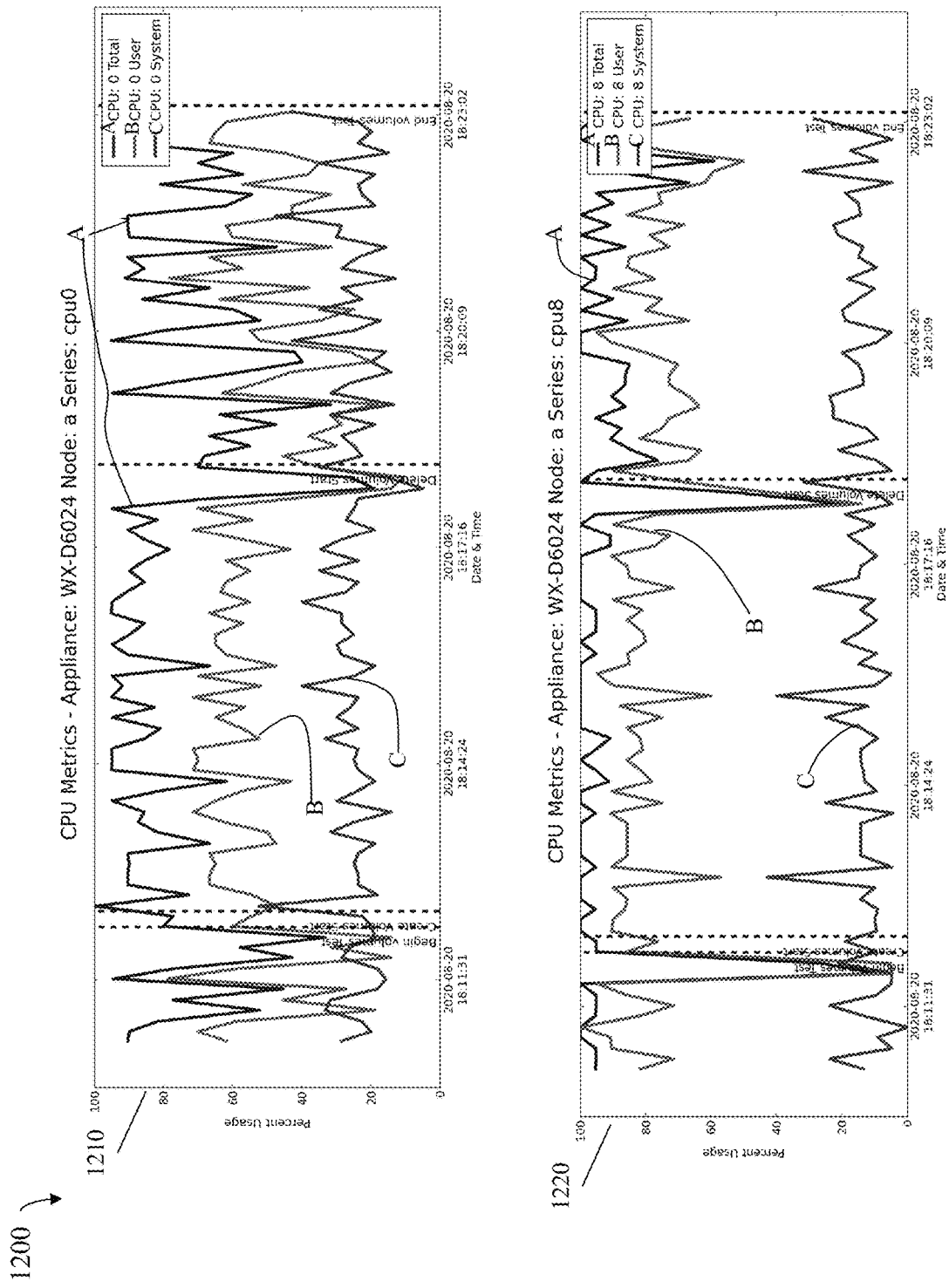

With reference to FIGS. 8A and 8B, shown are graphical illustrations of CPU utilization on nodes A and B of the appliance when executing the volumes test in an embodiment in accordance with the techniques herein. FIG. 8A shows the CPU utilization for the CPUs of node A and FIG. 8B shows the CPU utilization for the CPUs of node B. FIGS. 8A and 8B may be included in a report produced by the report generator 418. Additionally, in at least one embodiment, the run analysis output generated by the run analyzer may include the graphs of FIGS. 8A and 8B along with additional commentary and analysis information consistent with the analysis description below regarding FIGS. 8A and 8B.

In FIG. 8A, the graph 1210 shows the CPU utilization over time for CPU 0 on node A and the graph 1220 shows the CPU utilization over time for CPU 8 on node A. Additionally, each of the graphs 1210 and 1220 provide a further breakdown of CPU utilization in total, for user tasks, and for system tasks. From viewing the graphs 1210 and 1220 that may be included in the report, it may be observed that the CPU utilization is generally very high for both CPUs 0 and 8 of node A.

In FIG. 8B, the graph 1260 shows the CPU utilization over time for CPU 0 on node B and the graph 1270 shows the CPU utilization over time for CPU 8 on node B. Additionally, each of the graphs 1260 and 1270 provide a further breakdown of CPU utilization in total, for user tasks, and for system tasks. From viewing the graphs 1260 and 1270 that may be included in the report, it may be observed that the CPU utilization of the CPUs 0 and 8 of node B is generally much lower than the CPU utilization of the CPUs 0 and 8 of node A (as illustrated graphically in FIG. 8A).

The collected data used to generate the graphs of FIGS. 8A and 8B may be provided to the run analyzer 420 that may perform a relative comparison in terms of CPU utilization for nodes A and B and determine that there is a large difference between the CPU utilization levels of the nodes A and B. The comparison may be performed using any suitable mathematical metric. For example, a first average CPU utilization may be computed overall for the CPUs of node A and a second average CPU utilization may be computed overall for the CPUs of node B. The run analyzer 420 may determine that the difference between the first average CPU utilization and the second average CPU utilization exceeds a specified allowable difference threshold. Responsive to determining the difference exceeds the specified allowable difference threshold, the run analyzer 420 may output analysis information identifying the large disparity in CPU utilizations that indicates an unbalanced workload between the nodes A and B of the appliance. As such, an action may be taken to further balance the workload between the nodes A and B. In at least one embodiment, the action may be performed automatically. In some embodiments, the detected difference in unbalanced workload may be provided as an input to a workload balancing algorithm that may perform subsequent processing to automatically redistribute workload of the node A to the node B in an attempt to achieve a more even CPU utilization of the nodes A and B. In some embodiments, the detected unbalanced workload may be reported and require further investigation or review by a user of the system that is a data storage manager or administrator. In some cases, the detected unbalanced workload may be reported and require further investigation by the developers or engineers responsible for implementing the code of the workload balancing algorithms. It may be, for example, that such code requires improvement or correction to facilitate achieving a more balanced workload.

The data collected by the pg_stat collector is in connection with the data storage system configuration DB. The pg_stat collector may collect data regarding the individual queries performed on the data storage system configuration DB. For example, for each unique observed query, the following may be collected: the frequency or count regarding the number of times the query is performed may be recorded, the mean query time, and the total amount of time consumed in performing the same query. The total amount of time for a query may denote the aggregate or cumulative amount of time with respect to the frequency or count for the query. For example, if the same query Q1 is performed 10 times and it takes 10 milliseconds to perform each query Q1, then the total time for Q1 is 100 milliseconds.

Referring to FIG. 9A, shown is an example 1300 of information that may be included in a report for the queries made to the data storage system configuration DB having the largest mean query times. The example 1300 provides a table with an entry for each of the top ranked queries with the largest mean query time. The entries in the table 1300 may be ranked based on decreasing order of mean query time. Thus the first row 1304 has the highest mean query time, the second row 1306 has the second highest mean query time, and so on. The entry 1304 denotes the observed query having the largest mean time of about 301.9 milliseconds 1302 which is significantly larger than the second ranked mean query time of 12 millisecond as denoted by 1308 in the row 1306.

The collected data used to generate the table of FIG. 9A may be provided to the run analyzer 420 that may flag each row of the table 1300 with an average mean query time greater than a specified threshold. For example, a threshold may be specified resulting in the run analyzer only flagging the entry 1304 as having a mean average query time above the threshold. Any suitable action may be taken in response to the run analyzer detecting that this particular query 1311 of the entry 1304 has a mean query time exceeding the threshold. For example, the run analyzer may further extract and analyze the query of the entry 1304 to identify the one or more tables accessed in the read query. In this case, the run analyzer may parse the query of the row 1304 and determine that the metrics table 1310 is being accessed. In this example, the metrics table may be a table stored in the data storage system configuration DB. The run analyzer may further report the above analysis to a user for further review and investigation as to why accessing the metrics table with this particular query 1311 results in such a large average mean query time.

As another example in connection with the pg_stats collected for each query, reference is made to FIG. 9B. In FIG. 9B, shown is an example 1350 of information that may be included in a report for the queries made to the data storage system configuration DB having the largest mean query times. The example 1350 provides a table with an entry for each of the top ranked queries with the largest total time (denoting total query time) as described above. The entries in the table 1350 may be ranked based on decreasing order of total time. Thus the first row 1352 has the highest total time (1352*a*), the second row 1353 has the second highest total time, and so on.

Based on the total time, the top ranked entry 1352 has the largest total time 1352*a* of about 16130 milliseconds (or ~16 seconds) with an associated mean query time 1352*c* of about 10.75 milliseconds. The entry 1352 also indicates that the query 1352*d* of the row 1352 is performed 1500 times (as denoted by 1352*b*). Further analysis and parsing of the query 1352*d* indicates that the query includes an insert statement for the volumes table. The volumes table of the data storage system configuration DB may include information regarding the existing LUNs in the data storage system. When performing the volumes test, it may be expected to access the volumes table. In this example, the volumes test was executed to create and then delete 500 LUNs. However the query 1352*d* was performed 1500 times (1352*c*) which is 3 times the number of LUNs and may warrant further investigation.

The collected data used to generate the table of FIG. 9B may be provided to the run analyzer 420 that may flag each row of the table 1350 with a total query time greater than a specified threshold. For example, a threshold may be specified resulting in the run analyzer only flagging the entry 1352 as having a total query time above the threshold. Any suitable action may be taken in response to the run analyzer detecting that this particular query 1352*d* of the entry 1352 has a total time exceeding the threshold. For example, the run analyzer may further extract and analyze the query 1352*d* of the entry 1352 to identify the one or more tables accessed in the query. In this case, the run analyzer may parse the query 1352*d* of the row 1352 and detect (1360) that the query includes an insert statement and is inserting data into the volumes table. The run analyzer may further report the above analysis to a user for further review and investigation as to why this particular query 1352*d* accessing the volumes table is performed 1500 times.

The run analyzer may also review the information in the table 1350 and flag entries having a count or frequency (as denoted by the calls column 1351) that exceeds a specified threshold. For example, the entries 1354 and 1356 may both be flagged as having a values in the column 1351 exceeding the specified threshold.

The entry 1354 indicates that the query 1354a is performed 5464 times (as denoted by 1310a). The run analyzer may parse the query 1354a and detect (1354b) that the query is accessing a locking table and making a lock request. Consistent with other discussion herein, locking requests and locking tables may be implemented as part of a locking service for synchronizing and coordinating access to resources. In the embodiment illustrated the locks may be implemented using tables of the data storage system configuration DB 606. Thus, the query of the entry 1354 indicates that the same lock request query is issued 5464 times (1310a). The query 1354a may be made, for example, to obtain the status of a particular lock that may be needed in connection with executing the volumes test. The run analyzer may further report the above analysis to a user for further review and investigation as to why this particular query 1354a performing a lock request is performed 5464 times.

The entry 1356 indicates that the query 1356d is performed 18,369 times (as denoted by 1356a). The run analyzer may parse the query 1356d and detect (1356c) that the query is inserting or writing to an internal state machine table. In at least one embodiment, the steps needed to complete implementation or servicing of a management command may be represented using one or more state machines, where each such state machine including states and transitions. When servicing a management command, its associated current processing state may correspond to a state of a particular state machine. Thus, the internal state when processing or servicing a management request may be persistently stored in the data storage system configuration DB 606. Persisting the current state may useful for reliability and in case of a system reboot or crash resulting in a subsequent restart of the system. When restarting the system, the persisted state machine state information may be used to allow processing to resume at the point when the prior crash or reboot occurred. Thus, the current state with respect to processing performed to service a management command may be persisted to the state machine table of the data storage system configuration DB 606 frequently. The run analyzer 402 may further report the above analysis to a user for further review and investigation as to why this particular query 1356d is performed over 18,000 times when executing the volumes test for 500 LUNs.

The foregoing results of the run analyzer 402 may be reported, for example, to the engineering or development team for further investigation to see if any reductions or suitable optimizations can be made.

In at least one embodiment, the information of FIGS. 9A and 9B may be included in a report produced by the report generator 418. Additionally, in at least one embodiment, the run analysis output generated by the run analyzer 402 may include the information from the FIGS. 9A and 9B along with additional commentary and analysis information consistent with the above related analysis of the FIGS. 9A and 9B.

Thus, in at least one embodiment as described herein, the MAPS engine may be used to analyze the control path performance and resource consumption to identify bottlenecks. The MAPS engine, or more generally the techniques herein, have a wide variety of additional applications and uses. For example, the techniques herein may be used to provide recommendations regarding maximum limits for a system. To further illustrate, the MAPS engine may be used to test different control path limits. A test may be written like the volumes test which measures resource consumption when creating 2000 LUNs by issuing 2000 individual sequential create LUN commands. It may be that the volumes test is run to determine the maximum number of create LUN commands that may be in progress simultaneously. For example, the techniques herein may be performed to tune the internal system control limit on the maximum allowable number of create LUN commands that may be in progress at the same time in the data storage system. The maximum number may be based on, for example, the overall CPU utilization or the amount of consumed memory observed by the control path components when a particular number of create LUN commands are in progress at the same time. In a similar manner, maximum system limits or controls may be determined with respect to other data storage system services such as the maximum number of allowable simultaneous remote replication sessions. For example, a customer may want to be able to run 200,000 simultaneous remote replication sessions. Using the MAPS engine, one or more integrated tests may be used which test the foregoing and examine resource consumption of the system while the tests are executing. If, for example, resource consumption is saturated (e.g., CPU utilization is at 98%) at 200,000 simultaneous replication sessions, it may be desirable to test the resource consumption of the system for different lower amounts of simultaneous replication sessions and possibly under different system environments.

As noted above, an embodiment in accordance with the techniques herein may include support for batch execution mode where multiple MAPS engine commands or runs may be described and executed sequentially. To further illustrate, one embodiment may implement match execution mode using a Python script, batch_map.py, that is invoked through an interface, such as on a command line as:

batch_maps.py -maps_args MAPS_ARGS where:

-maps_args MAPS_ARGS are required and MAPS_ARGS denotes the path to an existing file including the MAPS command line arguments for the multiple MAPS command lines. An embodiment may include additional flags and arguments on the above batch execution mode command line.

In at least one embodiment, the MAPS argument file including the MAPS command line arguments may be a file that defines an array of MAPS argument execution flags. In particular, the MAP argument file may include the following first portion describing a set of global arguments used for two MAPS engine command executions:

```
{
  "global_args":{
    "cyc_path": "/home/cyc/Repositories/latest/cyc_core",   /* line M1 */
    "sys": "WX-D0000-BM:WX-D0001-BM",                       /* line M2 */
    "metrics": "cpu",                                        /* line M3 */
```

```
        "cpu_cpuset": "0,8",                               /*line M4 */
        "cpu_processes": "java,xms",                       /*line M5 */
        "tests": "dmtest",                                 /*line M6 */
            "dmtest": "/home/cyc/Repositories/MAPS/cyclone-    /*line M7*/
controlpath/tests/controlpath_dm_tests/dm_test/functional_tests/replication/vol/remote/
test_replicationsScale.py",
            "dm_param_file": "/home/cyc/Repositories/MAPS/cyclone-   /*line M8
controlpath/tests/controlpath_dm_tests/dm_test/param_files/params_rep_scale.json",
            "dm_testbed": "/home/cyc/Repositories/MAPS/cyclone-        /* line M9
controlpath/tests/performance_scripts/MAPS/tests/WX-D0500_WX-D0501.json"
    }
```

In the above first portion of the MAPS argument file, elements of the global_args array correspond to different MAPS command line arguments. For example, the lines M1, M2, and M3 above correspond respectively to the MAPS command line arguments 1004, 1006 and 1008 of FIG. 4A; the lines M4 and M5 provide MAPS command line arguments for the cpu collector identifying the cpus 0 and 8 (line M4) for which CPU data is collected, and identifying a list of desired processes (line M5) for which CPU data is collected; and the line M6 identifies the test named "dmtest" to be executed where the "dmtest" command line arguments and options are specified in the lines M7, M8 and M9).

Additionally, the MAPS argument file may include the following run arguments in an array_maps_run_args where each entry of cell of the array indicates MAPS engine run information for a single MAPS command.

```
        "maps_run_args": [
            {
                "setup": true,
                "deploy": true,
                "cpu_processes": "java"
            },
            { }
        ]
    }
```

In the above maps_run_args, there are 2 entries denoting run information for 2 MAPS engine command executions. Each of the two MAPS engine runs uses the command line arguments denoted by the global_args array above with any optional additions or modifications that vary per run denoted by an associated entry in the maps_run_args array. For example the first MAPS engine run is performed using the MAPS command line arguments as in the global_args array with the additional variations denoted by the associated first entry of the maps_runs_args array. The first entry of the maps_runs_args array includes "setup": true, "deploy": true, and "cpu_processes": "java" which adds the additional command line option for "setup" and "deploy" and adds an additional cpu process "java" about which to collect cpu data. The second MAPS engine run is performed using the MAPS command line arguments as in the global_args array with the additional variations denoted by the associated second entry of the maps_runs_args array. The second entry of the maps_runs_args array is empty whereby the second MAPS engine run is performed using only the MAPS command line arguments as in the global_args array.

Figure 10:
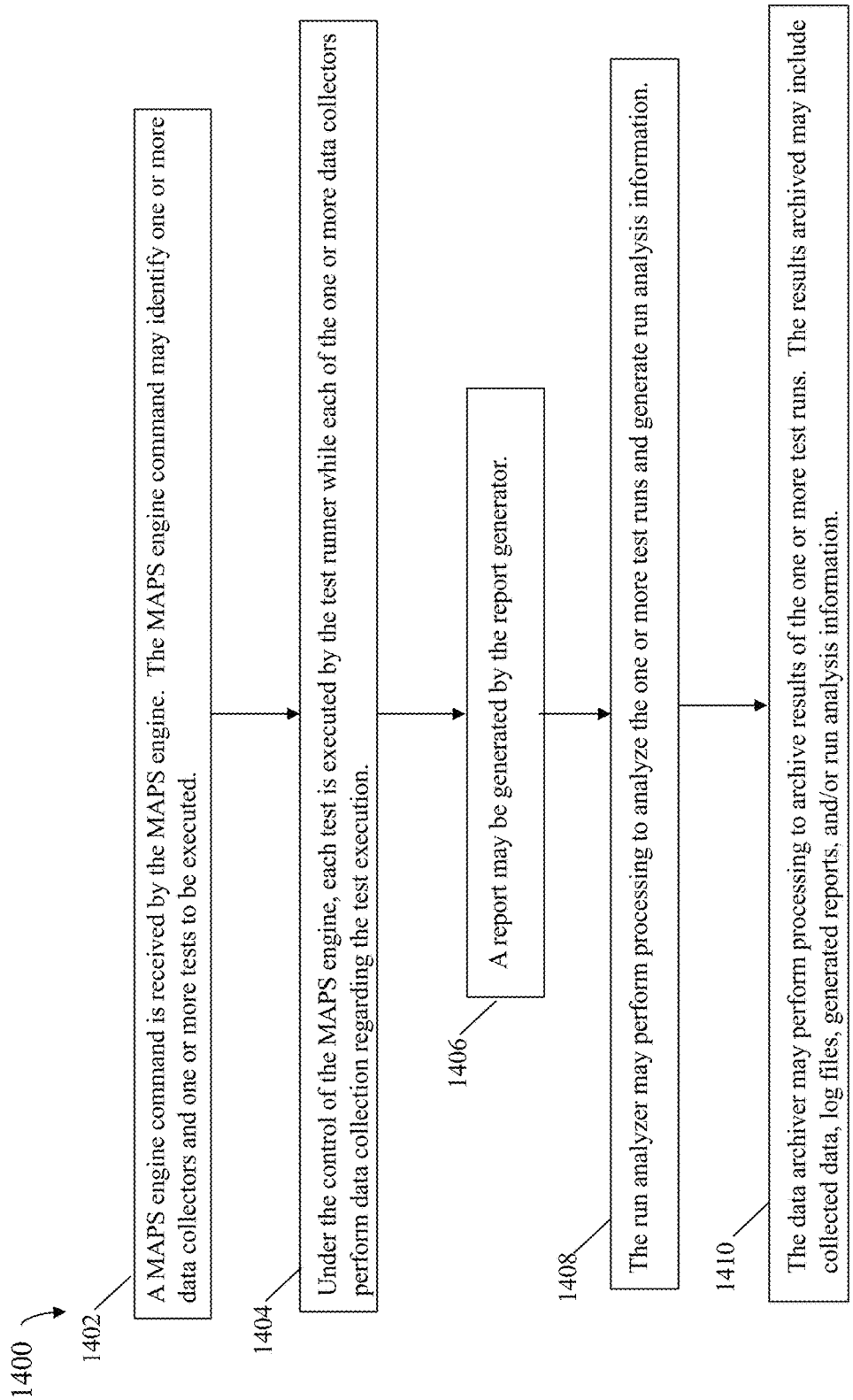
FIGS. 10, 11 and 12 are flowcharts of processing steps that may be performed in an embodiment in accordance with the techniques herein.
Figure 11:
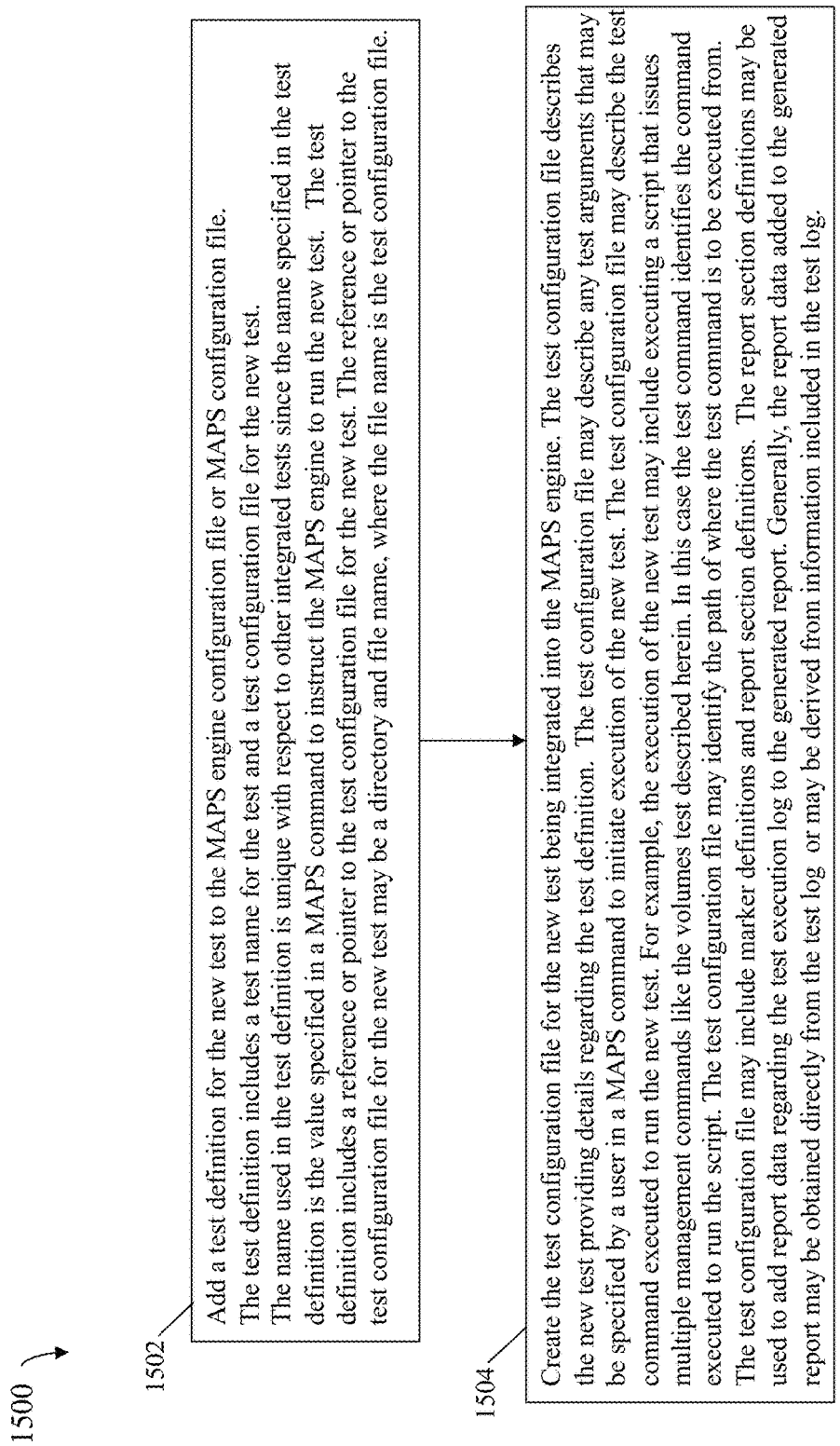
Figure 12:
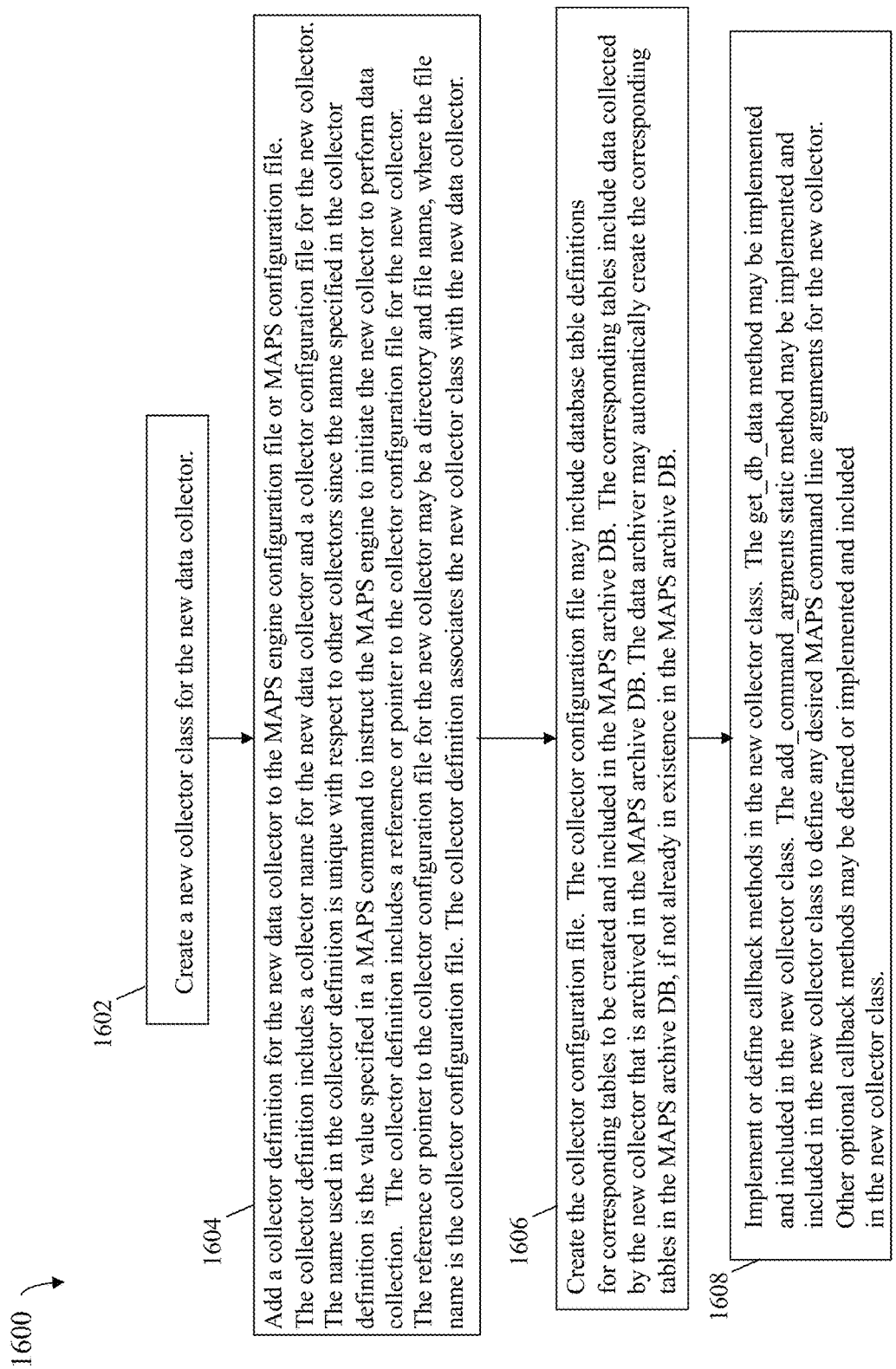

What will now be described in connection with the FIGS. 10, 11 and 12 are flowcharts of processing steps that may be performed in an embodiment in accordance with the techniques herein. The flowcharts of the FIGS. 10, 11 and 12 summarize processing described above.

Referring to FIG. 10, shown is a first flowchart 1400 of processing steps that may be performed in an embodiment in accordance with the techniques herein. The first flowchart 1400 generally describes the processing that may be performed by different components of the MAPS engine responsive to receiving a MAPS engine command. Variations from the processing of the flowchart 1400 may be performed due to particular options included in the MAPS command received at the step 1402.

At the step 1402, a MAPS engine command (also referred to herein as the MAPS command) is received by the MAPS engine. The MAPS engine command may identify one or more data collectors and one or more tests to be executed. The MAPS engine command may also include other information as described herein. From the step 1402, control proceeds to the step 1404.

At the step 1404, the MAPS engine commences processing in accordance with the MAPS command received in the step 1402. In the step 1404, under the control of the MAPS engine, each test identified by the MAPS command is executed by the test runner while each of the one or more data collectors perform data collection regarding the test execution. From the step 1404, control proceeds to the step 1406.

At the step 1406, after execution of the tests identified in the MAPS command have completed, a report may be generated by the report generator. From the step 1406, control proceeds to the step 1408.

At the step 1408, the run analyzer may perform processing to analyze the one or more test runs and generate analysis information. From the step 1408, control proceeds to the step 1410.

At the step 1410, the data archiver may perform processing to archive results of the one or more test runs. The results archived may include collected data, log files, generated reports, and/or run analysis information.

Consistent with other discussion herein, the processing performed to service or execute the MAPS command received in the step 1402 is coordinated by the MAPS engine. The MAPS engine facilitates test execution and data collection by running the test indicated on the MAPS command line and performing processing to activate or initiate the data collector(s) identified in the MAPS command, where such data collector(s) perform data collection during execution of the test.

Referring to FIG. 11, shown is a second flowchart 1500 of processing steps that may be performed in an embodiment in accordance with the techniques herein. The second flowchart generally describes how to add a new integrated test to the MAPS engine in at least one embodiment in accordance with the techniques herein.

At the step 1502, a test definition for the new test may be added to the MAPS engine configuration file or MAPS configuration file. The test definition includes a test name for the test and a test configuration file for the new test. The name used in the test definition is unique with respect to other integrated tests since the name specified in the test definition is the value specified in a MAPS command to instruct the MAPS engine to run the new test. The test definition includes a reference or pointer to the test configuration file for the new test. The reference or pointer to the test configuration file for the new test may be a directory and file name, where the file name is the test configuration file. From the step 1502, control proceeds to the step 1504.

At the step 1504, the test configuration file for the new test being integrated into the MAPS engine may be created. The test configuration file describes the new test providing details regarding the test definition. The test configuration file may describe any test arguments that may be specified by a user in a MAPS command to initiate execution of the new test. The test configuration file may describe the test command executed to run the new test. For example, the execution of the new test may include executing a script that issues multiple management commands like the volumes test described herein. In this case the test command identifies the command executed to run the script. The test configuration file may identify the path of where the test command is to be executed from. The test configuration file may include marker definitions and report section definitions. The report section definitions may be used to add report data regarding the test execution log to the generated report. Generally, the report data added to the generated report may be obtained directly from the test log or may be derived from information included in the test log.

Referring to FIG. 12, shown is a third flowchart 1600 of processing steps that may be performed in an embodiment in accordance with the techniques herein. The third flowchart generally describes processing that may be performed in at least one embodiment to add a new data collector to the MAPS engine.

At the step 1602, processing may be performed to create a new collector class for the new data collector. From the step 1602, control proceeds to the step 1604.

At the step 1604, a new collector definition for the new data collector may be added to the MAPS engine configuration file or MAPS configuration file. The collector definition includes a collector name for the new data collector and a collector configuration file for the new collector. The name used in the collector definition is unique with respect to other collectors since the name specified in the collector definition is the value specified in a MAPS command to instruct the MAPS engine to initiate the new collector to perform data collection. The collector definition includes a reference or pointer to the collector configuration file for the new collector. The reference or pointer to the collector configuration file for the new collector may be a directory and file name, where the file name is the collector configuration file. The collector definition associates the new collector class with the new data collector. From the step 1604, control proceeds to the step 1606.

At the step 1606, the collector configuration file may be created. The collector configuration file may include database table definitions for corresponding tables to be created and included in the MAPS archive DB 206. The corresponding tables include data collected by the new collector that is archived in the MAPS archive DB 206. The data archiver may automatically create the corresponding tables in the MAPS archive DB 206, if not already in existence in the MAPS archive DB. From the step 1606, control proceeds to the step 1608.

At the step 1608, one or more callback methods in the new collector class may be defined or implemented. The get_db_ data method may be implemented and included in the new collector class. The add_command_arguments static method may be implemented and included in the new collector class to define any desired MAPS command line arguments for the new collector. Other optional callback methods may be defined or implemented and also included in the new collector class. Such other optional callback methods may include any of setup, start, stop, gather, postprocessing, and cleanup, as described herein.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of testing comprising:
receiving a first command at a framework, wherein the first command includes first information identifying a first test to be executed and a first collector that collects data during execution of the first test; and
responsive to receiving the first command, perform processing to execute the first command, wherein the processing is coordinated by the framework and wherein the processing includes:
executing the first test;
collecting test data, wherein the test data is collected by the first collector during execution of the first test; and
generating a report regarding the test data collected while executing the first test, wherein the first test includes executing a first data storage system management command on a control or management path.

2. The method of claim 1, further comprising:
executing a run analyzer of the framework to analyze the test data collected by the first collector.

3. A method of testing comprising:
receiving a first command at a framework, wherein the first command includes first information identifying a first test to be executed and a first collector that collects data during execution of the first test; and
responsive to receiving the first command, perform processing to execute the first command, wherein the processing is coordinated by the framework and wherein the processing includes:
executing the first test;
collecting test data, wherein the test data is collected by the first collector during execution of the first test; and
generating a report regarding the test data collected while executing the first test, wherein the framework receives a first configuration file including a first test definition for the first test and including a first collector definition for the first collector, wherein the first test definition includes a first test name of the first test and includes a reference to the first test configuration file describing the first test definition, and wherein the first collector definition includes a first collector name for the first collector and includes a reference to the first collector configuration file for the first collector.

4. The method of claim 3, wherein the first command includes the first test name identifying the first test, and wherein the first command includes the first collector name identifying the first collector.

5. The method of claim 3, wherein the first test configuration file describes one or more arguments used when executing the first test, and wherein the first command includes one or more values corresponding to the one or more arguments.

6. The method of claim 5, wherein execution of the first test is recorded in a first test log, and wherein the first test configuration file includes one or more report definitions describing data items of the first test log included in corresponding report data of the report.

7. The method of claim 6, wherein a first report definition of the one or more report definitions includes matching criteria and a report data item, wherein the matching criteria identifies a pattern that is matched to a data item of the first test log, and wherein the data item matching the matching criteria is extracted from the first test log file and assigned to the report data item included in the report.

8. The method of claim 7, wherein the framework includes an orchestrator component that coordinates execution of a plurality of other components of the framework, and wherein the plurality of other components includes a collector controller that controls execution of the first collector, a test runner that controls execution of the first test, and a report generator that generates the report, wherein the orchestrator component coordinates sending the report data item from the collector controller to the report generator, and wherein the orchestrator component coordinates sending other report data from the collector controller to the report generator, wherein the other report data is collected by the first collector.

9. The method of claim 8, wherein the first collector configuration file includes a first database table definition of a first table included in an archive database, wherein the first table includes data collected by the first collector.

10. The method of claim 9, wherein the framework includes a data archive component that receives first data collected by the first collector and stores the first data in the first table of the archive database.

11. The method of claim 10, wherein the first collector includes a first method or routine that is a first callback method or routine, and wherein the framework calls the first method or routine of the first collector during execution of the first test.

12. The method of claim 11, wherein the first collector includes a second method or routine that is a second callback method or routine, and wherein the framework calls the second method or routine of the first collector to identify command line arguments for the first collector.

13. The method of claim 12, wherein the first collector includes a third method or routine that is a third callback method or routine, and wherein the framework calls the third method or routine of the first collector to return the first data, that is collected by the first collector, to the data archive component.

14. A system comprising:
one or more processors; and
one or more memories comprising code stored thereon that, when executed, performs a method of testing comprising:
receiving a first command at a framework, wherein the first command includes first information identifying a first test to be executed and a first collector that collects data during execution of the first test; and
responsive to receiving the first command, perform processing to execute the first command, wherein the processing is coordinated by the framework and wherein the processing includes:
executing the first test;
collecting test data, wherein the test data is collected by the first collector during execution of the first test; and
generating a report regarding the test data collected while executing the first test, wherein the first test includes executing a first data storage system management command on a control or management path.

15. A non-transitory computer readable medium comprising code stored thereon that, when executed, performs a method of testing comprising:
receiving a first command at a framework, wherein the first command includes first information identifying a first test to be executed and a first collector that collects data during execution of the first test; and
responsive to receiving the first command, perform processing to execute the first command, wherein the processing is coordinated by the framework and wherein the processing includes:
executing the first test;
collecting test data, wherein the test data is collected by the first collector during execution of the first test; and
generating a report regarding the test data collected while executing the first test, wherein the first test includes executing a first data storage system management command on a control or management path.

16. A non-transitory computer readable medium comprising code stored thereon that, when executed, performs a method of testing comprising:
receiving a first command at a framework, wherein the first command includes first information identifying a first test to be executed and a first collector that collects data during execution of the first test; and
responsive to receiving the first command, perform processing to execute the first command, wherein the processing is coordinated by the framework and wherein the processing includes:
executing the first test;
collecting test data, wherein the test data is collected by the first collector during execution of the first test; and
generating a report regarding the test data collected while executing the first test, wherein the framework receives a first configuration file including a first test definition for the first test and including a first collector definition for the first collector, wherein the first test definition includes a first test name of the first test and includes a reference to first test configuration file describing the first test definition, and wherein the first collector definition includes a first collector name for the first collector and includes a reference to first collector configuration file for the first collector.

17. The non-transitory computer readable medium of claim 16, wherein the first command includes the first test name identifying the first test, and wherein the first command includes the first collector name identifying the first collector.

18. The non-transitory computer readable medium of claim 16, wherein the first test configuration file describes one or more arguments used when executing the first test, and wherein the first command includes one or more values corresponding to the one or more arguments.

19. A system comprising:
one or more processors; and
a memory comprising code stored thereon that, when executed, performs a method of testing comprising:
receiving a first command at a framework, wherein the first command includes first information identifying a first test to be executed and a first collector that collects data during execution of the first test; and
responsive to receiving the first command, perform processing to execute the first command, wherein the processing is coordinated by the framework and wherein the processing includes:
executing the first test;
collecting test data, wherein the test data is collected by the first collector during execution of the first test; and
generating a report regarding the test data collected while executing the first test, wherein the framework receives a first configuration file including a first test definition for the first test and including a first collector definition for the first collector, wherein the first test definition includes a first test name of the first test and includes a reference to the first test configuration file describing the first test definition, and wherein the first collector definition includes a first collector name for the first collector and includes a reference to the first collector configuration file for the first collector.

\* \* \* \* \*